US012477493B2

(12) United States Patent
Lin

(10) Patent No.: US 12,477,493 B2
(45) Date of Patent: Nov. 18, 2025

(54) TRANSMISSION METHOD, TERMINAL, AND NETWORK DEVICE

(71) Applicant: GUANGDONG OPPO MOBILE TELECOMMUNICATIONS CORP., LTD., Dongguan (CN)

(72) Inventor: Hao Lin, Neuilly-sur-seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 351 days.

(21) Appl. No.: 17/980,765

(22) Filed: Nov. 4, 2022

(65) Prior Publication Data

US 2023/0068762 A1  Mar. 2, 2023

Related U.S. Application Data

(63) Continuation of application No. PCT/CN2021/079828, filed on Mar. 9, 2021.

(30) Foreign Application Priority Data

May 6, 2020 (EP) .................................... 20315235

(51) Int. Cl.
*H04W 56/00* (2009.01)
*H04W 84/06* (2009.01)

(52) U.S. Cl.
CPC ........ *H04W 56/0045* (2013.01); *H04W 84/06* (2013.01)

(58) Field of Classification Search
CPC ............. H04W 74/0833; H04W 74/08; H04W 56/0045; H04W 84/06; H04W 72/0453;

(Continued)

(56) References Cited

U.S. PATENT DOCUMENTS 12,192,941 B2 * 1/2025 Dai ...................... H04B 17/318
2011/0165878 A1 * 7/2011 Nylander .............. H04W 60/04
455/436

(Continued)

FOREIGN PATENT DOCUMENTS

CN  105050178 A  11/2015
CN  111093261 A   5/2020

(Continued)

OTHER PUBLICATIONS

ZTE Corporation et al., "Consideration on Random Access for NTN", R2-1903391, 3GPP TSG RAN WG2 Meeting #105bis Xi'an, China, Apr. 8-Apr. 12, 2019.

(Continued)

*Primary Examiner* — Nathan S Taylor
(74) *Attorney, Agent, or Firm* — BAYES PLLC

(57) ABSTRACT

The present application relates to a transmission method, a terminal, and a network device. The transmission method comprises: receiving, by a terminal, first information which comprises timing advance (TA) related information, wherein the TA related information is used to indicate a TA used by the terminal for transmission; and performing, by the terminal, transmission based on the TA. In an embodiment of the present application, the terminal receives the first information, acquires TA related information from the first information so as to obtain an accurate TA. The TA-based transmission can improve transmission reliability.

19 Claims, 4 Drawing Sheets

(58) Field of Classification Search
CPC ..... H04W 72/23; H04W 56/00; H04W 72/04; H04L 5/0007; H04L 5/0023; H04L 5/0044; H04L 5/0048; H04L 5/0053; H04L 5/00; H04L 27/26025; H04L 5/0092; H04B 7/18504; H04B 7/1851; H04B 7/2041; H04B 7/185
USPC ......................................................... 370/350
See application file for complete search history.

(56) References Cited

U.S. PATENT DOCUMENTS

| | | | |
|---|---|---|---|
| 2012/0218987 A1 | 8/2012 | Zhao et al. | |
| 2019/0342845 A1* | 11/2019 | Laselva | H04W 72/0446 |
| 2021/0029658 A1* | 1/2021 | Mahalingam | H04W 74/0833 |
| 2021/0105761 A1* | 4/2021 | Cheng | H04L 5/0053 |
| 2021/0175964 A1* | 6/2021 | Kusashima | H04W 56/0005 |
| 2021/0321464 A1* | 10/2021 | Lin | H04B 7/1851 |
| 2021/0352606 A1* | 11/2021 | Hosseinian | H04W 64/006 |
| 2021/0352714 A1* | 11/2021 | Gao | H04W 36/0005 |
| 2022/0006514 A1* | 1/2022 | Sedin | H04B 7/18528 |
| 2022/0124795 A1* | 4/2022 | Wu | H04W 56/0045 |
| 2022/0272760 A1* | 8/2022 | Murray | H04W 74/0833 |
| 2022/0345961 A1* | 10/2022 | Tao | H04W 36/0077 |
| 2022/0408389 A1* | 12/2022 | Wang | H04W 56/0045 |
| 2022/0417885 A1* | 12/2022 | Dai | H04L 5/0091 |

FOREIGN PATENT DOCUMENTS

| | | | | |
|---|---|---|---|---|
| WO | 2012139454 A1 | 10/2012 | | |
| WO | WO-2019097922 A1 | * | 5/2019 | ............. H04B 7/185 |
| WO | WO-2019195457 A1 | * | 10/2019 | ......... H04B 7/18504 |
| WO | WO-2020031120 A2 | * | 2/2020 | ........... H04B 7/1851 |

OTHER PUBLICATIONS

Extend European Search Report issued in European application No. 20315235.0, mailed Oct. 22, 2020.
3GPP TS 22.261 V16.6.0 (Dec. 2018); Technical Specification Group Services and System Aspects; Service requirements for the 5G system; Stage 1 (Release 16).
3GPP TS 22.119 V16.0.0 (Dec. 2018); Technical Specification Group Services and System Aspects; Maritime Communication Services over 3GPP system; Stage 1 (Release 16).
International Search Report issued in International application No. PCT/CN2021/079828, mailed May 27, 2021.
Written Opinion of the International Searching Authority issued in International application No. PCT/CN2021/079828, mailed May 27, 2021.
First Office Action issued in European application No. 20315235.0, mailed Jan. 15, 2024.

* cited by examiner

TRANSMISSION METHOD, TERMINAL, AND NETWORK DEVICE

CROSS-REFERENCE TO RELATED APPLICATIONS

The present application is a continuation of International Application No. PCT/CN2021/079828 filed on Mar. 9, 2021, which claims the benefit of priority to European Application No. 20315235.0 filed on May 6, 2020, the entire disclosures of both are incorporated herein as a part of the present application for all purposes.

TECHNICAL FIELD

The present application relates to the communication field, and more particularly to a transmission method, a terminal, and a network device.

BACKGROUND

Non-terrestrial networks (NTNs) include a network or a network segment that uses an airborne vehicle or a space vehicle for transmission. The NTNs include a spacecraft, an airborne vehicle, etc. With respect to a conventional terrestrial cellular system, a base station of the NTN system may be a spacecraft such as a satellite. In this way, the distance from the base station to a terrestrial terminal is much longer than that in the conventional terrestrial cellular system. For example, a general point-to-point distance in the conventional terrestrial cellular system, that is, a distance from a base station to a terminal, is 1 kilometer to several kilometers. However, in the NTN system, the point-to-point distance is determined based on satellite orbit deployment. In a general low earth orbit (LEO) scenario, the point-to-point distance may be 600 kilometers to 1200 kilometers. However, in a geosynchronous earth orbit (GEO) satellite scenario, the point-to-point distance may be up to more than 35 million kilometers. Moreover, the movement speed of a low earth orbit satellite is very fast and generally reaches 7.6 kilometers per second, which is equivalent to more than 27,000 kilometers per hour. Such high-speed movement is extremely rare in the conventional terrestrial cellular system. Therefore, how to realize reliable communication in scenarios with ultra-long distances and base station movements is a problem that needs to be solved.

SUMMARY

Embodiments of the present application provide a transmission method, a terminal, and a network device, so as to obtain an accurate TA and improve transmission reliability.

A first aspect of the present application provides a transmission method, which comprises:

receiving, by a terminal, first information which comprises timing advance (TA) related information, wherein the TA related information is used to indicate a TA used by the terminal for transmission; and performing, by the terminal, transmission based on the TA.

In combination with the first aspect, in another method of the first aspect of the present application, the method is applied to a non-terrestrial network (NTN) system.

In combination with any of the above-mentioned methods of the first aspect, in another method of the first aspect of the present application, the first information is carried in system information.

In combination with any of the above-mentioned methods of the first aspect, in another method of the first aspect of the present application, the TA related information is comprised in a serving cell configuration common SIB IE and/or a footprint configuration IE of the system information.

In combination with any of the above-mentioned methods of the first aspect, in another method of the first aspect of the present application, the TA related information comprises a target value of a TA parameter, or the TA related information indicates the target value of the TA parameter.

In combination with any of the above-mentioned methods of the first aspect, in another method of the first aspect of the present application, types of the TA parameter comprise at least one of the following:

a TA value;
a first numerical value; and
a first granularity.

In combination with any of the above-mentioned methods of the first aspect, in another method of the first aspect of the present application, the TA value represents the length of the advanced time of the transmission performed by the terminal, the TA value is related to the first numerical value and/or the first granularity, and the first granularity represents a time unit of the first numerical value.

In combination with any of the above-mentioned methods of the first aspect, in another method of the first aspect of the present application, the first information is carried in a random access response RAR.

In combination with any of the above-mentioned methods of the first aspect, in another method of the first aspect of the present application, the TA related information comprises a target value of a TA adjustment parameter, or the TA related information indicates the target value of the TA adjustment parameter.

In combination with any of the above-mentioned methods of the first aspect, in another method of the first aspect of the present application, types of the TA adjustment parameter comprise at least one of the following:

a TA adjustment value;
a second numerical value; and
a second granularity.

In combination with any of the above-mentioned methods of the first aspect, in another method of the first aspect of the present application, types of the TA adjustment parameter comprise at least one of the following:

the TA adjustment value represents the length of time for which a TA used by the terminal in previous transmission needs to be adjusted, the TA adjustment value is related to the second numerical value and/or the second granularity, and the second granularity represents a time unit of the second numerical value.

In combination with any of the above-mentioned methods of the first aspect, in another method of the first aspect of the present application, types of the TA adjustment parameter comprise at least one of the following:

when the TA used by the terminal for transmission is determined based on the first information from a network device, the TA adjustment value conforms to a first range; and when the TA used by the terminal for transmission is determined based on second information obtained by the terminal itself, the TA adjustment value is within a second range.

In combination with any of the above-mentioned methods of the first aspect, in another method of the first aspect of the present application, types of the TA adjustment parameter comprise at least one of the following:

the first range comprises a positive value and 0, and the second range comprises a positive value, a negative value, and 0.

In combination with any of the above-mentioned methods of the first aspect, in another method of the first aspect of the present application, types of the TA adjustment parameter comprise at least one of the following:

the method further comprises: sending, by the terminal, third information which comprises the TA related information.

In combination with any of the above-mentioned methods of the first aspect, in another method of the first aspect of the present application, types of the TA adjustment parameter comprise at least one of the following:

the third information is represented by a random access preamble index and/or a resource location of a PRACH occasion, or the third information is carried in a message 3 in a random access process.

A second aspect of the present application provides a transmission method, which comprises:

acquiring, by a terminal, timing advance (TA) related information which is used to indicate a TA used by the terminal for transmission; and performing, by the terminal, transmission based on the TA.

In combination with the second aspect, in another method of the second aspect of the present application, said acquiring, by a terminal, TA related information comprises: receiving, by the terminal, first information from a network device, wherein the first information comprises the TA related information.

In combination with any of the above-mentioned methods of the second aspect, in another method of the second aspect of the present application, the first information is carried in system information.

In combination with any of the above-mentioned methods of the second aspect, in another method of the second aspect of the present application, the TA related information is comprised in a serving cell configuration common SIB IE and/or a footprint configuration IE of the system information.

In combination with any of the above-mentioned methods of the second aspect, in another method of the second aspect of the present application, the system information comprises at least one of the following: a SIBx, where x is a positive integer greater than or equal to 1; and an MIB.

In combination with any of the above-mentioned methods of the second aspect, in another method of the second aspect of the present application, the first information is carried in a random access response RAR.

In combination with any of the above-mentioned methods of the second aspect, in another method of the second aspect of the present application, the first information is carried in an RRC message.

In combination with any of the above-mentioned methods of the second aspect, in another method of the second aspect of the present application, at least one of the following information elements (IEs) in the RRC message comprises the TA related information:
 a serving cell handover command;
 a serving cell configuration common IE;
 a serving cell configuration IE;
 a footprint configuration IE;
 an uplink configuration IE;
 a downlink configuration IE;
 an uplink bandwidth part (BWP) configuration IE;
 a downlink bandwidth part (BWP) configuration IE; and
 a beam failure recovery (BFR) configuration IE.

In combination with any of the above-mentioned methods of the second aspect, in another method of the second aspect of the present application, the footprint configuration IE comprises the TA related information, and the footprint configuration IE is comprised in the serving cell configuration IE.

In combination with any of the above-mentioned methods of the second aspect, in another method of the second aspect of the present application, the footprint configuration IE comprises the TA related information, and the footprint configuration IE comprises the uplink configuration IE and/or the downlink configuration IE.

In combination with any of the above-mentioned methods of the second aspect, in another method of the second aspect of the present application, the first information is carried in a MAC-CE.

In combination with any of the above-mentioned methods of the second aspect, in another method of the second aspect of the present application, the first information is carried in DCI.

In combination with any of the above-mentioned methods of the second aspect, in another method of the second aspect of the present application, the TA related information comprises a target value of a TA parameter, and the target value of the TA parameter is used to determine the TA used by the terminal for transmission.

In combination with any of the above-mentioned methods of the second aspect, in another method of the second aspect of the present application, the TA related information comprises network device related information, and the network device related information indicates the target value of the TA parameter.

In combination with any of the above-mentioned methods of the second aspect, in another method of the second aspect of the present application, the network device related information comprises at least one of network device deployment information, a network device type, an orbit type, and a distance from the ground.

In combination with any of the above-mentioned methods of the second aspect, in another method of the second aspect of the present application, the TA related information comprises frequency point information, and the frequency point information indicates the target value of the TA parameter.

In combination with any of the above-mentioned methods of the second aspect, in another method of the second aspect of the present application, the frequency point information comprises a frequency point value or a frequency point range.

In combination with any of the above-mentioned methods of the second aspect, in another method of the second aspect of the present application, the TA related information comprises at least one identifier, and the identifier indicates the target value of the TA parameter.

In combination with any of the above-mentioned methods of the second aspect, in another method of the second aspect of the present application, types of the TA parameter comprise at least one of the following:
 a TA value;
 a first numerical value;
 a first granularity;
 a first scale factor;
 a first reference granularity;
 a first subcarrier spacing;
 a second subcarrier spacing;
 a first scale numerical value; and
 a first reference numerical value.

In combination with any of the above-mentioned methods of the second aspect, in another method of the second aspect of the present application, the TA value is related to the first numerical value and/or the first granularity.

In combination with any of the above-mentioned methods of the second aspect, in another method of the second aspect of the present application, the first granularity comprises a first time unit.

In combination with any of the above-mentioned methods of the second aspect, in another method of the second aspect of the present application, the first time unit is related to a subcarrier spacing.

In combination with any of the above-mentioned methods of the second aspect, in another method of the second aspect of the present application, the first granularity is related to the first scale factor and/or the first reference granularity.

In combination with any of the above-mentioned methods of the second aspect, in another method of the second aspect of the present application, the first scale factor is related to the first scale numerical value and/or the first subcarrier spacing.

In combination with any of the above-mentioned methods of the second aspect, in another method of the second aspect of the present application, the first reference granularity is related to the first reference numerical value and/or the second subcarrier spacing.

In combination with any of the above-mentioned methods of the second aspect, in another method of the second aspect of the present application, the TA related information comprises a target value of a TA adjustment parameter.

In combination with any of the above-mentioned methods of the second aspect, in another method of the second aspect of the present application, types of the TA adjustment parameter comprise at least one of the following:
- a TA adjustment value;
- a second numerical value;
- a second granularity;
- a second scale factor;
- a second reference granularity;
- a third subcarrier spacing;
- a fourth subcarrier spacing;
- a second scale numerical value; and
- a second reference numerical value.

In combination with any of the above-mentioned methods of the second aspect, in another method of the second aspect of the present application, the TA adjustment value is related to the second numerical value and/or the second granularity.

In combination with any of the above-mentioned methods of the second aspect, in another method of the second aspect of the present application, the second granularity comprises a second time unit.

In combination with any of the above-mentioned methods of the second aspect, in another method of the second aspect of the present application, the second time unit is related to a subcarrier spacing.

In combination with any of the above-mentioned methods of the second aspect, in another method of the second aspect of the present application, the second granularity is related to the second scale factor and/or the second reference granularity.

In combination with any of the above-mentioned methods of the second aspect, in another method of the second aspect of the present application, the second scale factor is related to the second scale numerical value and/or the third subcarrier spacing.

In combination with any of the above-mentioned methods of the second aspect, in another method of the second aspect of the present application, the second reference granularity is related to the second reference numerical value and/or the fourth subcarrier spacing.

In combination with any of the above-mentioned methods of the second aspect, in another method of the second aspect of the present application, the TA adjustment value comprises a positive value, a negative value, or 0.

In combination with any of the above-mentioned methods of the second aspect, in another method of the second aspect of the present application, when a first condition is met, the TA adjustment value comprises a positive value or 0.

In combination with any of the above-mentioned methods of the second aspect, in another method of the second aspect of the present application, the first condition is that: the TA is related to the first information.

In combination with any of the above-mentioned methods of the second aspect, in another method of the second aspect of the present application, when a second condition is met, the TA adjustment value comprises a positive value, a negative value, or 0.

In combination with any of the above-mentioned methods of the second aspect, in another method of the second aspect of the present application, the second condition is that: the TA is related to second information.

In combination with any of the above-mentioned methods of the second aspect, in another method of the second aspect of the present application, a range of the second numerical value is from 0 to M, where $M=a \times 3846$, $a=1$ or 2 or 3.

In combination with any of the above-mentioned methods of the second aspect, in another method of the second aspect of the present application, each transmission type has a candidate value sequence for a corresponding TA parameter.

In combination with any of the above-mentioned methods of the second aspect, in another method of the second aspect of the present application, each transmission type has a corresponding TA parameter: if the terminal performs PRACH transmission, a preset TA parameter is used; and if the terminal performs PUSCH, SRS, or PUCCH transmission, a preconfigured TA parameter is used.

In combination with any of the above-mentioned methods of the second aspect, another method of the second aspect of the present application further comprises: updating, by the terminal, the TA based on the TA adjustment value.

In combination with any of the above-mentioned methods of the second aspect, in another method of the second aspect of the present application, said updating, by the terminal, the TA based on the TA adjustment value comprises: obtaining a second TA based on a first TA and the TA adjustment value.

In combination with any of the above-mentioned methods of the second aspect, another method of the second aspect of the present application further comprises: determining, by the terminal, a TA corresponding to a target BWP based on TA related information corresponding to the target BWP to which the terminal is to be handed over.

In combination with any of the above-mentioned methods of the second aspect, another method of the second aspect of the present application further comprises: determining, by the terminal, the TA corresponding to the target BWP by using a TA corresponding to a current activated BWP, a delay parameter corresponding to the current activated BWP, and a delay parameter corresponding to the target BWP to which the terminal is to be handed over.

In combination with any of the above-mentioned methods of the second aspect, in another method of the second aspect of the present application, the delay parameter is related to at least one of the following:
the TA used by the terminal for transmission;

a data processing delay;
a channel transmission delay;
a round trip time RTT; and
a transmission resource allocation.

In combination with any of the above-mentioned methods of the second aspect, in another method of the second aspect of the present application, the current activated BWP and the target BWP are uplink BWPs.

In combination with any of the above-mentioned methods of the second aspect, in another method of the second aspect of the present application, said acquiring, by a terminal, TA related information comprises: acquiring, by the terminal, second information which comprises the TA related information.

In combination with any of the above-mentioned methods of the second aspect, in another method of the second aspect of the present application, said acquiring, by the terminal, the second information comprises: obtaining, by the terminal itself, the second information.

In combination with any of the above-mentioned methods of the second aspect, in another method of the second aspect of the present application, the second information comprises a location of the terminal and/or information of the network device.

In combination with any of the above-mentioned methods of the second aspect, in another method of the second aspect of the present application, the information of the network device comprises coordinate data of a satellite.

In combination with any of the above-mentioned methods of the second aspect, in another method of the second aspect of the present application, said performing, by the terminal, transmission based on the TA comprises: performing, by the terminal, transmission in an uplink frame based on the TA.

In combination with any of the above-mentioned methods of the second aspect, in another method of the second aspect of the present application, a start point of the uplink frame is earlier than that of a downlink frame corresponding to the uplink frame, and the length of the advanced time is the TA or a calculation result of the TA and an offset.

In combination with any of the above-mentioned methods of the second aspect, in another method of the second aspect of the present application, the uplink frame and the downlink frame are at the terminal side.

In combination with any of the above-mentioned methods of the second aspect, in another method of the second aspect of the present application, the transmission comprises at least one of PRACH, PUSCH, SRS, and PUCCH transmissions.

In combination with any of the above-mentioned methods of the second aspect, in another method of the second aspect of the present application, the transmission comprises sending third information which comprises the TA related information.

In combination with any of the above-mentioned methods of the second aspect, in another method of the second aspect of the present application, when the third information is transmitted in a PRACH, the third information is represented by a random access preamble index and/or a resource location of a PRACH occasion.

In combination with any of the above-mentioned methods of the second aspect, in another method of the second aspect of the present application, the third information is carried in a message 3 in a random access process.

In combination with any of the above-mentioned methods of the second aspect, in another method of the second aspect of the present application, the TA related information in the third information comprises a target value of a TA parameter or a range of the target value.

A third aspect of the present application provides a transmission method, which comprises:
sending, by a terminal, third information which comprises TA related information, wherein the TA related information is used to indicate a TA used to transmit the third information.

In combination with the third aspect, in another method of the third aspect of the present application, the third information is transmitted in an uplink frame.

In combination with any of the above-mentioned methods of the third aspect, in another method of the third aspect of the present application, a start point of the uplink frame is earlier than that of a downlink frame corresponding to the uplink frame, and the length of the advanced time is the TA or a calculation result of the TA and an offset.

In combination with any of the above-mentioned methods of the third aspect, in another method of the third aspect of the present application, the uplink frame and the downlink frame are at the terminal side.

In combination with any of the above-mentioned methods of the third aspect, in another method of the third aspect of the present application, the third information is transmitted in at least one of a PRACH, a PUSCH, an SRS, and a PUCCH.

In combination with any of the above-mentioned methods of the third aspect, in another method of the third aspect of the present application, when the third information is transmitted in the PRACH, the third information is represented by a random access preamble index and/or a resource location of a PRACH occasion.

In combination with any of the above-mentioned methods of the third aspect, in another method of the third aspect of the present application, the third information is carried in a message 3 in a random access process.

In combination with any of the above-mentioned methods of the third aspect, in another method of the third aspect of the present application, the TA related information in the third information comprises a target value of a TA parameter or a range of the target value.

In combination with any of the above-mentioned methods of the third aspect, in another method of the third aspect of the present application, with regard to types, meanings, and examples of the TA parameter, and manners of obtaining the target value of the TA parameter based on the TA related information, references can be made to related descriptions of the transmission method in the second aspect described above.

A fourth aspect of the present application provides a transmission method, which comprises:
sending, by a network device, timing advance (TA) related information which is used to indicate a TA used by a terminal for transmission; and
receiving, by the network device, transmission performed by the terminal based on the TA.

In combination with the fourth aspect, in another method of the fourth aspect of the present application, said sending, by a network device, TA related information comprises:
sending, by the network device, first information which comprises the TA related information.

In combination with any of the above-mentioned methods of the fourth aspect, in another method of the fourth aspect of the present application, the first information is carried in system information.

In combination with any of the above-mentioned methods of the fourth aspect, in another method of the fourth aspect of the present application, the TA related information is comprised in a serving cell configuration common SIB IE and/or a footprint configuration IE of the system information.

In combination with any of the above-mentioned methods of the fourth aspect, in another method of the fourth aspect of the present application, the system information comprises at least one of the following: a SIBx, where x is a positive integer greater than or equal to 1; and an MIB.

In combination with any of the above-mentioned methods of the fourth aspect, in another method of the fourth aspect of the present application, the first information is carried in a random access response RAR.

In combination with any of the above-mentioned methods of the fourth aspect, in another method of the fourth aspect of the present application, the first information is carried in an RRC message.

In combination with any of the above-mentioned methods of the fourth aspect, in another method of the fourth aspect of the present application, a plurality of IEs in the RRC messages comprise the TA related information, and with regard to examples of IEs in the RRC message, references can be made to related descriptions of the transmission method in the second aspect described above.

In combination with any of the above-mentioned methods of the fourth aspect, in another method of the fourth aspect of the present application, the first information is carried in a MAC-CE.

In combination with any of the above-mentioned methods of the fourth aspect, in another method of the fourth aspect of the present application, the first information is carried in DCI.

In combination with any of the above-mentioned methods of the fourth aspect, in another method of the fourth aspect of the present application, the TA related information comprises a target value of a TA parameter, and the target value of the TA parameter is used to determine the TA used by the terminal for transmission. With regard to types, meanings, and examples of the TA parameter, and manners of obtaining the target value of the TA parameter based on the TA related information, references can be made to related descriptions of the transmission method in the second aspect described above.

In combination with any of the above-mentioned methods of the fourth aspect, in another method of the fourth aspect of the present application, the TA related information comprises a target value of a TA adjustment parameter. With regard to types, meanings, and examples of the TA adjustment parameter, and manners of obtaining the target value of the TA adjustment parameter based on the TA related information, references can be made to related descriptions of the transmission method in the second aspect described above.

In combination with any of the above-mentioned methods of the fourth aspect, in another method of the fourth aspect of the present application, said receiving, by the network device, transmission performed by the terminal based on the TA comprises: receiving, by the network device, transmission performed by the terminal in an uplink frame based on the TA.

In combination with any of the above-mentioned methods of the fourth aspect, in another method of the fourth aspect of the present application, a start point of the uplink frame is earlier than that of a downlink frame corresponding to the uplink frame, and the length of the advanced time is the TA or a calculation result of the TA and an offset.

In combination with any of the above-mentioned methods of the fourth aspect, in another method of the fourth aspect of the present application, the uplink frame and the downlink frame are at the terminal side.

In combination with any of the above-mentioned methods of the fourth aspect, in another method of the fourth aspect of the present application, the transmission comprises at least one of PRACH, PUSCH, SRS, and PUCCH transmissions.

In combination with any of the above-mentioned methods of the fourth aspect, in another method of the fourth aspect of the present application, the transmission comprises sending third information which comprises the TA related information.

In combination with any of the above-mentioned methods of the fourth aspect, in another method of the fourth aspect of the present application, when the third information is transmitted in a PRACH, the third information is represented by a random access preamble index and/or a resource location of a PRACH occasion.

In combination with any of the above-mentioned methods of the fourth aspect, in another method of the fourth aspect of the present application, the third information is carried in a message 3 in a random access process.

In combination with any of the above-mentioned methods of the fourth aspect, in another method of the fourth aspect of the present application, the TA related information in the third information comprises a target value of a TA parameter or a range of the target value.

A fifth aspect of the present application provides a transmission method, which comprises: receiving, by a network device, third information which comprises TA related information.

In combination with the fifth aspect, in another method of the fifth aspect of the present application, the third information is transmitted in an uplink frame.

In combination with any of the above-mentioned methods of the fifth aspect, in another method of the fifth aspect of the present application, a start point of the uplink frame is earlier than that of a downlink frame corresponding to the uplink frame, and the length of the advanced time is the TA or a calculation result of the TA and an offset.

In combination with any of the above-mentioned methods of the fifth aspect, in another method of the fifth aspect of the present application, the uplink frame and the downlink frame are at a terminal side.

In combination with any of the above-mentioned methods of the fifth aspect, in another method of the fifth aspect of the present application, the third information is transmitted in at least one of a PRACH, a PUSCH, an SRS, and a PUCCH.

In combination with any of the above-mentioned methods of the fifth aspect, in another method of the fifth aspect of the present application, when the third information is transmitted in the PRACH, the third information is represented by a random access preamble index and/or a resource location of a PRACH occasion.

In combination with any of the above-mentioned methods of the fifth aspect, in another method of the fifth aspect of the present application, the third information is carried in a message 3 in a random access process.

In combination with any of the above-mentioned methods of the fifth aspect, in another method of the fifth aspect of the present application, the TA related information in the third information comprises a target value of a TA parameter or a range of the target value. With regard to types of the TA parameter, the target value of the TA parameter, the range of the target value, manners of obtaining the target value of the TA parameter based on the TA related information, references can be made specifically to related descriptions of the transmission method in the second aspect described above.

A sixth aspect of the present application provides a terminal, which comprises:

an acquisition unit configured to acquire timing advance (TA) related information which is used to indicate a TA used by the terminal for transmission; and a transmission unit configured to perform transmission based on the TA.

In combination with the sixth aspect, in another method of the sixth aspect of the present application, the acquisition unit is configured to receive first information from a network device, wherein the first information comprises the TA related information.

In combination with any of the above-mentioned methods of the sixth aspect, in another method of the sixth aspect of the present application, with regard to carrying manners of the first information, references can be made to related descriptions of the transmission method in the second aspect described above.

In combination with any of the above-mentioned methods of the sixth aspect, in another method of the sixth aspect of the present application, the TA related information comprises a target value of a TA parameter, and the target value of the TA parameter is used to determine the TA used by the terminal for transmission. With regard to types, meanings, and examples of the TA parameter, and manners of obtaining the target value of the TA parameter based on the TA related information, references can be made to related descriptions of the transmission method in the second aspect described above.

In combination with any of the above-mentioned methods of the sixth aspect, in another method of the sixth aspect of the present application, the TA related information comprises a target value of a TA adjustment parameter. With regard to types, meanings, and examples of the TA adjustment parameter, and manners of obtaining the target value of the TA adjustment parameter based on the TA related information, references can be made to related descriptions of the transmission method in the second aspect described above.

In combination with any of the above-mentioned methods of the sixth aspect, in another method of the sixth aspect of the present application, the terminal further comprises: an update unit configured to update the TA based on the TA adjustment value.

In combination with any of the above-mentioned methods of the sixth aspect, in another method of the sixth aspect of the present application, the update unit is configured to obtain a second TA based on a first TA and the TA adjustment value.

In combination with any of the above-mentioned methods of the sixth aspect, in another method of the sixth aspect of the present application, the terminal further comprises: a first determination unit configured to determine a TA corresponding to a target BWP based on TA related information corresponding to the target BWP to which the terminal is to be handed over.

In combination with any of the above-mentioned methods of the sixth aspect, in another method of the sixth aspect of the present application, the terminal further comprises: a second determination unit configured to determine the TA corresponding to the target BWP by using a TA corresponding to a current activated BWP, a delay parameter corresponding to the current activated BWP, and a delay parameter corresponding to the target BWP to which the terminal is to be handed over.

In combination with any of the above-mentioned methods of the sixth aspect, in another method of the sixth aspect of the present application, with regard to the delay parameter and a specific process of BWP handover, references can be made to related descriptions of the transmission method in the second aspect described above.

In combination with any of the above-mentioned methods of the sixth aspect, in another method of the sixth aspect of the present application, the acquisition unit is configured to acquire second information which comprises the TA related information.

In combination with any of the above-mentioned methods of the sixth aspect, in another method of the sixth aspect of the present application, the acquisition unit is configured to obtain the second information by itself. The acquisition unit obtains the second information by itself to carry out a process of determining the TA for its own transmission. References can be made to related descriptions of the transmission method in the second aspect described above.

In combination with any of the above-mentioned methods of the sixth aspect, in another method of the sixth aspect of the present application, the transmission unit is configured to perform transmission in an uplink frame based on the TA, and references can be made to related descriptions of the transmission method in the second aspect described above.

In combination with any of the above-mentioned methods of the sixth aspect, in another method of the sixth aspect of the present application, the transmission unit is further configured to send third information which comprises the TA related information.

In combination with any of the above-mentioned methods of the sixth aspect, in another method of the sixth aspect of the present application, when the third information is transmitted in a PRACH, the third information is represented by a random access preamble index and/or a resource location of a PRACH occasion.

In combination with any of the above-mentioned methods of the sixth aspect, in another method of the sixth aspect of the present application, the third information is carried in a message 3 in a random access process.

In combination with any of the above-mentioned methods of the sixth aspect, in another method of the sixth aspect of the present application, the TA related information in the third information comprises a target value of a TA parameter or a range of the target value. With regard to explanations, examples, and carrying manners of the third information, references can be made to related descriptions of the transmission method in the second aspect described above.

A seventh aspect of the present application provides a terminal, which comprises:

a sending unit configured to send third information which comprises TA related information, wherein the TA related information is used to indicate a TA used to transmit the third information.

In combination with the seventh aspect, in another method of the seventh aspect of the present application, the third information is transmitted in an uplink frame.

In combination with any of the above-mentioned methods of the seventh aspect, in another method of the seventh aspect of the present application, a start point of the uplink frame is earlier than that of a downlink frame corresponding to the uplink frame, and the length of the advanced time is the TA or a calculation result of the TA and an offset.

In combination with any of the above-mentioned methods of the seventh aspect, in another method of the seventh aspect of the present application, the uplink frame and the downlink frame are at the terminal side.

In combination with any of the above-mentioned methods of the seventh aspect, in another method of the seventh aspect of the present application, the third information is transmitted in at least one of a PRACH, a PUSCH, an SRS, and a PUCCH.

In combination with any of the above-mentioned methods of the seventh aspect, in another method of the seventh aspect of the present application, when the third information is transmitted in the PRACH, the third information is represented by a random access preamble index and/or a resource location of a PRACH occasion.

In combination with any of the above-mentioned methods of the seventh aspect, in another method of the seventh aspect of the present application, the third information is carried in a message 3 in a random access process.

In combination with any of the above-mentioned methods of the seventh aspect, in another method of the seventh aspect of the present application, the TA related information in the third information comprises a target value of a TA parameter or a range of the target value.

In combination with any of the above-mentioned methods of the seventh aspect, in another method of the seventh aspect of the present application, with regard to types, meanings, and examples of the TA parameter, and manners of obtaining the target value of the TA parameter based on the TA related information, references can be made to related descriptions of the transmission method in the second aspect described above.

An eighth aspect of the present application provides a network device, which comprises:

a sending unit configured to send timing advance (TA) related information which is used to indicate a TA used by a terminal for transmission; and a receiving unit configured to receive transmission performed by the terminal based on the TA.

In combination with the eighth aspect, in another method of the eighth aspect of the present application, the sending unit is configured to sending first information which comprises the TA related information.

In combination with any of the above-mentioned methods of the eighth aspect, in another method of the eighth aspect of the present application, with regard to carrying manners of the first information, references can be made to related descriptions of the transmission method in the second aspect described above.

In combination with any of the above-mentioned methods of the eighth aspect, in another method of the eighth aspect of the present application, the TA related information comprises a target value of a TA parameter, and the target value of the TA parameter is used to determine the TA used by the terminal for transmission.

In combination with any of the above-mentioned methods of the eighth aspect, in another method of the eighth aspect of the present application, the TA related information comprises network device related information, and the network device related information indicates the target value of the TA parameter. With regard to types, meanings, and examples of the TA parameter, and manners of obtaining the target value of the TA parameter based on the TA related information, references can be made to related descriptions of the transmission method in the second aspect described above.

In combination with any of the above-mentioned methods of the eighth aspect, in another method of the eighth aspect of the present application, the TA related information comprises a target value of a TA adjustment parameter. With regard to types, meanings, and examples of the TA adjustment parameter, and manners of obtaining the target value of the TA adjustment parameter based on the TA related information, references can be made to related descriptions of the transmission method in the second aspect described above.

In combination with any of the above-mentioned methods of the eighth aspect, in another method of the eighth aspect of the present application, the receiving unit is configured to receive transmission performed by the terminal in an uplink frame based on the TA, and references can be made to related descriptions of the transmission method in the second aspect described above.

In combination with any of the above-mentioned methods of the eighth aspect, in another method of the eighth aspect of the present application, a start point of the uplink frame is earlier than that of a downlink frame corresponding to the uplink frame, and the length of the advanced time is the TA or a calculation result of the TA and an offset.

In combination with any of the above-mentioned methods of the eighth aspect, in another method of the eighth aspect of the present application, the uplink frame and the downlink frame are at the terminal side.

In combination with any of the above-mentioned methods of the eighth aspect, in another method of the eighth aspect of the present application, said receiving, by a receiving unit, transmission performed by the terminal based on the TA comprises at least one of PRACH, PUSCH, SRS, and PUCCH transmissions.

In combination with any of the above-mentioned methods of the eighth aspect, in another method of the eighth aspect of the present application, the receiving unit receives third information sent by the terminal, wherein the third information comprises the TA related information. With regard to explanations, examples, and carrying manners of the third information, references can be made to related descriptions of the transmission method in the second aspect described above.

A ninth aspect of the present application provides a network device, which comprises:

a receiving unit configured to receive third information which comprises TA related information, wherein the TA related information is used to indicate a TA used to transmit the third information.

In combination with the ninth aspect, in another method of the ninth aspect of the present application, the third information is transmitted in an uplink frame.

In combination with any of the above-mentioned methods of the ninth aspect, in another method of the ninth aspect of the present application, a start point of the uplink frame is earlier than that of a downlink frame corresponding to the uplink frame, and the length of the advanced time is the TA or a calculation result of the TA and an offset.

In combination with any of the above-mentioned methods of the ninth aspect, in another method of the ninth aspect of the present application, the uplink frame and the downlink frame are at a terminal side.

In combination with any of the above-mentioned methods of the ninth aspect, in another method of the ninth aspect of the present application, the third information is transmitted in at least one of a PRACH, a PUSCH, an SRS, and a PUCCH.

In combination with any of the above-mentioned methods of the ninth aspect, in another method of the ninth aspect of the present application, when the third information is transmitted in the PRACH, the third information is represented by a random access preamble index and/or a resource location of a PRACH occasion.

In combination with any of the above-mentioned methods of the ninth aspect, in another method of the ninth aspect of the present application, the third information is carried in a message 3 in a random access process.

In combination with any of the above-mentioned methods of the ninth aspect, in another method of the ninth aspect of the present application, the TA related information in the third information comprises a target value of a TA parameter or a range of the target value. With regard to types, meanings, and examples of the TA parameter, and manners of obtaining the target value of the TA parameter based on the TA related information, references can be made to related descriptions of the transmission method in the second aspect described above.

A tenth aspect of the present application provides a terminal, which comprises a processor and a memory. The memory is configured to store a computer program, and the processor is configured to invoke and run the computer program stored in the memory to carry out the transmission methods described above.

An eleventh aspect of the present application provides a network device, which comprises a processor and a memory. The memory is configured to store a computer program, and the processor is configured to invoke and run the computer program stored in the memory to carry out the transmission methods described above.

A twelfth aspect of the present application provides a chip, which is configured to implement the transmission methods described above.

Specifically, the chip comprises: a processor configured to invoke and run a computer program from a memory, such that a device with the chip mounted therein carries out the transmission methods described above.

A thirteenth aspect of the present application provides a computer readable storage medium for storing a computer program that causes a computer to carry out the transmission methods described above.

A fourteenth aspect of the present application provides a computer program product comprising a computer program instruction that causes a computer to carry out the transmission methods described above.

A fifteenth aspect of the present application provides a computer program that, when run on a computer, causes the computer to carry out the transmission methods described above.

In the embodiments of the present application, the terminal can obtain an accurate TA based on TA related information. The TA-based transmission can improve transmission reliability.

DETAILED DESCRIPTION OF EMBODIMENTS

Figure 1:
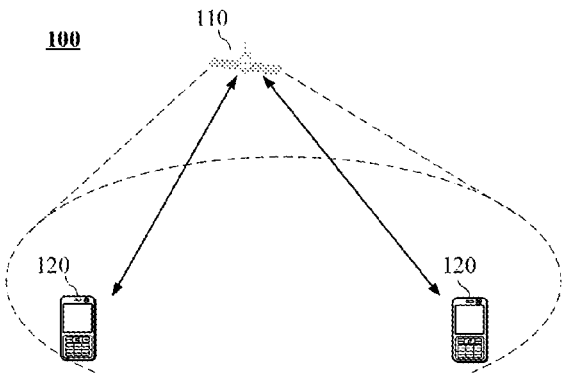
FIG. 1 is a schematic diagram of an application scenario according to an embodiment of the present application.

The technical solutions in the embodiments of the present application will be described below in conjunction with the drawings in the embodiments of the present application.

The technical solutions in the embodiments of the present application may be applied to various communication systems, for example: a Global System for Mobile communication (GSM), a code division multiple access (CDMA) system, a wideband code division multiple access (WCDMA) system, a general packet radio service (GPRS) system, a Long Term Evolution (LTE) system, an advanced Long Term Evolution (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a wireless local area network (WLAN) system, a Wireless Fidelity (WiFi) system, a 5th generation (5G) system, or other communication systems, etc.

In general, the number of connections supported by conventional communication systems is limited and easy to realize. However, with the development of communication technologies, mobile communication systems will not only support conventional communications, but also support for example device to device (D2D) communications, machine to machine (M2M) communications, machine type communication (MTC), and vehicle to vehicle (V2V) communications. The embodiments of the present application may also be applied to these communication systems.

Alternatively, a communication system in the embodiments of the present application may be applied to a carrier aggregation (CA) scenario, also to a dual connectivity (DC) scenario, or further to a standalone (SA) networking scenario.

An applied spectrum is not limited in the embodiments of the present application. For example, the embodiments of the present application may be applied to a licensed spectrum, also to an unlicensed spectrum or a shared spectrum.

In the embodiments of the present application, the various embodiments are described in conjunction with a network device and a terminal device. The terminal device may also be referred to as a user equipment (UE), an access terminal, a user unit, a user station, a mobile station, a mobile console, a remote station, a remote terminal, a mobile device, a user terminal, a terminal, a wireless communication device, a user agent, a user apparatus, etc. The terminal device may be a station (ST) in a WLAN, or may be a cellular phone, a cordless phone, a session initiation protocol (SIP) phone, a wireless local loop (WLL) station, a personal digital assistant (PDA) device, a handheld device with a wireless communication function, a computing device, other processing devices connected to a wireless modem, a vehicle-mounted device, a wearable device, or a terminal device in a next generation system such as an NR network or a terminal device in a future evolved public land mobile network (PLMN), etc.

By way of example but not limitation, in the embodiments of the present application, the terminal device may also be a wearable device. The wearable device may also be referred to as a wearable smart device, and is a general term for the application of wearable technologies to intelligent designing of daily wear or the development of wearable devices such as glasses, gloves, watches, clothes, and shoes. The wearable device is a portable device that is worn directly on the body or integrated into the clothes or accessories of a user. The wearable device is not only a hardware device, but also implements powerful functions through software support, data interaction, and cloud interaction. A generalized wearable smart device includes for example a smart watch or smart glasses that are characterized by full functions, a large size, and capable of implementing complete or partial functions without relying on smart phones; and includes for example various smart bracelets and smart jewelries for sign monitoring that focus only on a certain type of application function and need to be used in conjunction with other devices such as smart phones.

The network device may be a device for communicating with a mobile device, and may be an access point (AP) in a WLAN, a base transceiver station (BTS) in the GSM or CDMA, may also be a NodeB (NB) in WCDMA, or may further be an evolved NodeB (eNB or eNodeB) in LTE, a relay station or an access point, a vehicle-mounted device, a wearable device, a network device (gNB) in an NR network, a network device in a future evolved PLMN, etc. The network device may also be a spacecraft, an airborne vehicle, etc. in an NTN. The spacecraft includes a satellite, for example, a low earth orbit (LEO) satellite, a middle earth orbit (MEO) satellite, a geosynchronous earth orbit (GEO) satellite, and a high earth orbit (HEO) satellite. The airborne vehicle or an airborne platform includes a high altitude platform (HAP) comprising an unmanned aircraft system (UAS), a light aeroplane (LTA) lighter than the aerial UAS, a heavy aeroplane (HTA) heavier than the aerial UAS, etc. An airplane comprised in the airborne vehicle generally operates quasi-statically at an altitude of 8 km to 50 km. The NTN system may communicate in a specific spectrum, and the spectrum may be a licensed spectrum and belongs to a specific operator; or the spectrum is an unlicensed spectrum, that is, different NTN service operators share the spectrum.

In the embodiments of the present application, the network device provides services for a cell, and the terminal device communicates with the network device through transmission resources (for example, frequency domain resources, or spectrum resources) used by the cell. The cell may be a cell corresponding to the network device (for example, a base station), and the cell may belong to a macro base station, or belong to a base station corresponding to a small cell. The small cell here may include a metro cell, a micro cell, a pico cell, a femto cell, etc. These small cells are characterized by a small coverage range and low transmit power, and are suitable for providing high-speed data transmission services.

FIG. 1 exemplarily shows a communication system 100, which comprises a network device 110 and a terminal device 120. Alternatively, the communication system 100 may comprise a plurality of network devices 110, and the coverage range of each network device 110 may comprise a plurality of terminal devices 120, which is not limited in the embodiments of the present application.

Exemplarily, the network device 110 may be a spacecraft or an airborne vehicle. There is wireless communication between the terminal device 120 and the spacecraft or the airborne vehicle, and the terminal device 120 may send data to the spacecraft or the airborne vehicle through a link between the terminal device 120 and the spacecraft or the airborne vehicle. After receiving the data, the spacecraft or the airborne vehicle may send the data to a terrestrial receiving station (not shown in the figure) through a link between the spacecraft or the airborne vehicle and the terrestrial receiving station. After receiving the data from the spacecraft or the airborne vehicle node, the terrestrial receiving station transmits the data to a core network (a data network), and then the data is processed through the core network, for example, data interaction with other terminals is performed. Alternatively, the network device 110 may have functions of a terrestrial base station, for example, encoding and decoding processing of received or sent data, a terminal scheduling function, etc. Under this architecture, for a terminal device, the spacecraft or the airborne vehicle may be taken as a base station device. Alternatively, the network device 110 only has a relay function, that is, after data received at the terminal side is simply filtered at an analog end, frequency-converted, and amplified, the network device without functions of a base station forwards the data to the terrestrial receiving station. Under this architecture, for the terminal device, the spacecraft or the airborne vehicle is not a base station device, while the base station device is still the terrestrial base station. Alternatively, the terminal device 120 may communicate with the network device 110 and/or the terrestrial base station.

The spacecrafts include satellites, and the satellites may be divided into an LEO satellite, an MEO satellite, a GEO satellite, etc. As the satellite moves, the coverage ranges of the low earth orbit satellite and the middle earth orbit satellite move relative to the earth surface, and the coverage range of the geosynchronous satellite is stationary relative to the earth surface. The move speed of the low earth orbit satellite is very fast, and such high-speed movement causes the coverage range of the satellite to change rapidly relative to the earth surface. Moreover, a satellite node is relatively far from a terrestrial terminal. For example, a satellite altitude from the LEO satellite to the terminal may be 600 kilometers to 1500 kilometers. A satellite altitude of the MEO satellite may be 7000 kilometers to 20000 kilometers. A satellite altitude of the GEO satellite may be up to more than 35 million kilometers. An altitude of the airborne vehicle is generally 8 kilometers to 50 kilometers.

It should be appreciated that the terms "system" and "network" are usually used interchangeably herein. The term "and/or" herein simply represents an association relationship that describes associated objects, and represents that three relationships may exist, for example, A and/or B may represent the following three cases: only A exists, both A and B exist, and only B exists. In addition, the character "/" generally indicates an "or" relationship between the associated objects.

Figure 2:
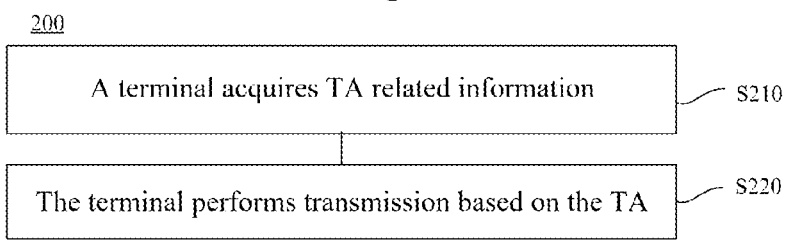
FIG. 2 is a schematic flowchart of a transmission method according to one embodiment of the present application.

FIG. 2 is a schematic flowchart of a transmission method 200 according to one embodiment of the present application. Alternatively, the method may be applied to the system shown in FIG. 1, but is not merely limited thereto. The method may be applied to an NTN system. The method comprises at least part of the followings.

S210, acquiring, by a terminal, timing advance (TA) related information. The TA related information is used to indicate a TA used by the terminal for transmission.

S220, performing, by the terminal, transmission based on the TA.

After acquiring the TA related information, the terminal may determine the to-be-used TA based on the TA related information. Then, the terminal performs transmission based on the determined TA. For example, the terminal performs uplink transmission or sidelink transmission based on the TA.

Alternatively, in an embodiment of the present application, said acquiring, by a terminal, TA related information in S210 comprises: receiving, by the terminal, first information from a network device, wherein the first information comprises the TA related information. The network device may include, but is not limited to, a base station, a spacecraft, an airborne vehicle, etc.

Alternatively, in an embodiment of the present application, the first information is carried in system information.

Alternatively, in an embodiment of the present application, the system information comprises at least one of the following: a system information block (SIB) x, where x is a positive integer greater than or equal to 1; and a master information block (MIB). For example, the SIBx includes a SIB1, a SIB2, a SIB3, a SIB4, a SIB5, etc.

Specifically, the SIB1 may be transmitted in a physical downlink shared channel (PDSCH). The PDSCH is allocated by downlink control information (DCI). The DCI is transmitted in common search space sets (CSS sets) of a type 0-physical downlink control channel (PDCCH), and is in a DCI format 1-0. Cyclic redundancy check (CRC) scrambling is performed on the DCI by using a system information (SI)-radio network temporary identity (RNTI).

Alternatively, the TA related information may be indicated in the SIB 1. When being indicated in the SIB1, the TA related information may be indicated in at least one of the following information elements (IEs):

a serving cell configuration common SIB IE (ServingCellConfigCommonSIB IE);

an uplink configuration common SIB IE (UplinkConfigCommonSIB IE);

a Bandwidth part (BWP) uplink common IE (BWP-UplinkCommon IE);

a random access channel (RACH) configuration common IE (RACH-ConfigCommon IE); and a footprint configuration IE (Footprint-Config IE).

Exemplarily, the network device in the NTN system can emit a plurality of beams at the same time, and each beam is projected onto the ground to form an area, which can be referred to as a footprint. A serving cell may include a plurality of footprints. A footprint may be a partial area of a serving cell, and areas of different footprints may partially overlap. Different footprints may correspond to different TAs. The footprint configuration IE may include valid uplink and downlink configuration information in this area.

Moreover, the MIB may be transmitted in a physical broadcast channel (PBCH). The TA related information may be indicated in a payload of the PBCH, or may be indicated in the MIB of the PBCH.

Alternatively, in an embodiment of the present application, the first information is carried in a random access response (RAR).

Specifically, the RAR may be transmitted in the PDSCH. The PDSCH is allocated by DCI. The DCI is transmitted in common search space sets of a type 1-PDCCH, and is in a DCI format 1-0. CRC scrambling is performed on the DCI by using a random access (RA)-RNTI or a message B (MsgB)-RNTI.

Alternatively, in an embodiment of the present application, the first information is carried in a radio resource control (RRC) message.

Alternatively, in an embodiment of the present application, the RRC message may include one or more information elements (IEs). These information elements may be used to indicate configuration information of a cell. At least one of the following IEs in the RRC message may comprise the TA related information:

a serving cell handover command;

a serving cell configuration common IE (ServingCellConfigCommon IE);

a serving cell configuration IE (ServingCellConfig IE);

a footprint configuration IE;

an uplink configuration IE;

a downlink configuration IE;

an uplink bandwidth part (BWP) configuration IE;

a downlink bandwidth part (BWP) configuration IE; and a beam failure recovery (BFR) configuration IE.

For example, the serving cell handover command may comprise the TA related information in at least one of the following IEs:

a handover command message IE (handoverCommandMessage IE);

a reconfiguration with synchronization IE (ReconfigurationWithSync IE);

a random access channel configuration common IE (RACH-ConfigCommon IE); and a random access channel configuration dedicated IE (RACH-ConfigDedicated IE).

Alternatively, the footprint configuration IE described above may be comprised in the serving cell configuration IE. For example, if one serving cell comprises a plurality of footprints, a footprint configuration IE (Footprint-Config) may be newly added to the serving cell configuration IE, and each footprint configuration IE may be configured with valid uplink and downlink information in an area corresponding to a different footprint.

Alternatively, in an embodiment of the present application, the footprint configuration IE comprises the TA related information. For example, the TA related information may be represented by a parameter such as a TA related parameter in the footprint configuration IE.

Alternatively, in an embodiment of the present application, the footprint configuration IE comprises the uplink configuration IE and/or the downlink configuration IE. For example, the TA related information may be represented by a parameter such as a TA related parameter in the uplink configuration IE and/or the downlink configuration IE in the footprint configuration IE.

Alternatively, in an embodiment of the present application, the first information is carried in a media access control control element (MAC-CE).

Alternatively, in an embodiment of the present application, the first information is carried in DCI.

Alternatively, in an embodiment of the present application, the TA related information comprises a target value of a TA parameter. The target value of the TA parameter may be used to determine the TA used by the terminal for transmission.

Alternatively, in an embodiment of the present application, types of the TA parameter comprise at least one of the following:

a TA value;
a first numerical value;
a first granularity;
a first scale factor;
a first reference granularity;
a first subcarrier spacing;
a second subcarrier spacing;
a first scale numerical value; and
a first reference numerical value.

In the TA parameters described above, the TA value may represent the length of the advanced time of transmission performed by the terminal, for example, the length of the advanced time of transmitting an uplink frame by the terminal relative to a downlink frame. The TA value may be determined based on the first numerical value and the first granularity. The first granularity represents a time unit of the first numerical value. The first granularity may be determined based on the first scale factor and the first reference granularity. The first scale factor may represent a scale ratio of the first granularity. The first reference granularity represents a time unit for determining the first granularity. The first granularity is a scaled time unit of the first reference granularity. The first scale factor may be determined based on the first subcarrier spacing and the second subcarrier spacing. The first reference granularity may be determined based on the first reference numerical value and the second subcarrier spacing.

For example, the TA value in the TA parameters described above is related to the first numerical value and/or the first granularity. For example, TA=N×G, where N represents the first numerical value, and G represents the first granularity. Alternatively, the first numerical value may be an integer.

Alternatively, in an embodiment of the present application, the first granularity comprises a first time unit. For example, it is 1 s, 1 ms or 1 slot.

Alternatively, in an embodiment of the present application, the first granularity represents a time unit of the first numerical value.

Alternatively, the first time unit may be related to a subcarrier spacing. The subcarrier spacing may be in a unit of Hz.

Alternatively, in an embodiment of the present application, the first granularity is related to the first scale factor and/or the first reference granularity.

Alternatively, in an embodiment of the present application, the first scale factor is related to the first scale numerical value and/or the first subcarrier spacing.

Alternatively, the TA parameter is indicated by a system message or an RRC message, or may be preset in a protocol.

Alternatively, in an embodiment of the present application, the first reference granularity is related to the first reference numerical value and/or the second subcarrier spacing.

For example, the TA is expressed as: TA=N×G, where N represents a first numerical value, G represents a first granularity, and G is related to a subcarrier spacing. Alternatively, the first granularity is related to the first reference granularity, for example, the first granularity is expressed as: G=c×$G_{ref}$, where c is the first scale factor, and the scale factor is a rational number and is determined based on the first subcarrier spacing; and $G_{ref}$ is the first reference granularity, and the reference granularity represents a reference time unit. The reference granularity is determined based on the second subcarrier spacing. The first scale factor determines a relationship between the first granularity and the first reference granularity. For example, when the first scale factor increases, the first granularity increases based on the first reference granularity. When the first scale factor decreases, the first granularity decreases based on the first reference granularity. When the first scale factor is 1, the first granularity is equal to the first reference granularity.

Alternatively, in an embodiment of the present application, the first subcarrier spacing may be a preconfigured subcarrier spacing or a preset subcarrier spacing, and the second subcarrier spacing may be a preconfigured subcarrier spacing or a preset subcarrier spacing. The first subcarrier spacing may not be equal to the second subcarrier spacing. Alternatively, the first reference granularity is determined based on the value of the second subcarrier spacing, for example, the second subcarrier spacing is 480 kHz, and the first reference granularity is calculated based on 480 kHz. Alternatively, the first scale factor is determined based on a parameter value corresponding to the first subcarrier spacing, for example, candidate values of the first subcarrier spacing are 15 kHz, 30 kHz, 60 kHz, and 120 kHz, which correspond to parameter values 0, 1, 2, and 3 respectively. When the first subcarrier spacing is 15 kHz, the first scale factor is calculated based on the parameter value 0 corresponding to the first subcarrier spacing. Alternatively, the first scale factor may be 1, that is, the first granularity is determined only by the first reference granularity, that is, $G=G_{ref}$.

For example, $$G = c \times G_{ref}, \text{ where } c = \frac{M1}{2^\mu},$$

M1 is the first scale numerical value, the first scale numerical value may be an integer, $2^\mu$ is 2 raised to the power of μ, and μ is related to the first subcarrier spacing. For example, as shown in Table 1, the value of μ may be equal to 0, 1, 2, or 3, which corresponds to a candidate value of the first subcarrier spacing: 15 kHz, 30 kHz, 60 kHz, or 120 kHz.

$$G_{ref} = \frac{1}{\Delta f \times M2},$$

where Δf represents the second subcarrier spacing. For example, when $$\Delta f = 480 \text{ kHz}, G_{ref} = \frac{1}{480 \text{ kHz} \times M2},$$

where M2 is the first reference numerical value. Alternatively, M2 may be an integer. Alternatively, M1 and M2 may be different.

Table 1 below is an example of a relationship between the first subcarrier spacing and μ.

TABLE 1

| First subcarrier spacing; | μ |
|---|---|
| 15 kHz | 0 |
| 30 kHz | 1 |
| 60 kHz | 2 |
| 120 kHz | 3 |

Alternatively, in an embodiment of the present application, each TA parameter may have one or more candidate values. One of the candidate values of the TA parameter may be selected as a target value of the TA parameter.

Alternatively, in an embodiment of the present application, the candidate values of the TA parameter may be related to a transmission type. The transmission type may represent the type of transmission performed by the terminal using a TA, which includes but is not limited to physical random access channel (Physical RACH, PRACH) transmission, PUSCH transmission, SRS transmission, and PUCCH transmission. For a certain TA parameter, each transmission type may have a corresponding candidate value sequence. Candidate value sequences corresponding to different transmission types may be the same, or partially the same, or completely different. For example, such a certain TA parameter is a TA value, a candidate value sequence corresponding to PRACH transmission is 10 ms, 20 ms, and 30 ms, and a candidate value sequence corresponding to other transmission is 40 ms, 50 ms, and 60 ms. For example, such a certain TA parameter is a first numerical value, a candidate value sequence corresponding to PRACH transmission is 1, 2, and 3, and a candidate value sequence of the parameter corresponding to other transmission is 4, 5, and 6.

Alternatively, in an embodiment of the present application, there may be a plurality of manners of obtaining the target value of the TA parameter based on the TA related information, and examples are as follows.

Manner I: The TA related information acquired by the terminal comprises at least one of target values of the TA parameters described above. For example, in the first information sent by the network device to the terminal device, the TA related information comprises any one or more of the target values of the TA parameters described above, and a target value of a TA parameter that is not indicated may be a preconfigured or preset value.

Exemplarily, the first information may include at least two of a target value of the TA value, a target value of the first numerical value, a target value of the first granularity, a target value of the first scale factor, a target value of the first reference granularity, a target value of the first subcarrier spacing, a target value of the second subcarrier spacing, a target value of the first scale numerical value, and a target value of the first reference numerical value.

Manner II: The TA related information acquired by the terminal indicates at least one of target values of the TA parameters described above. In the first information sent by the network device to the terminal device, the TA related information includes for example network device related information, frequency point information, or an identifier described below. The network device related information, the frequency point information, or the identifier indicates any one or more of the target values of the TA parameters described above, and a target value of a TA parameter that is not indicated may be a preconfigured or preset value.

Alternatively, in an embodiment of the present application, the TA related information comprises the network device related information, and the network device related information indicates the target value of the TA parameter.

Alternatively, in an embodiment of the present application, the network device related information includes at least one of network device deployment information, a network device type (a GEO, a non-GEO, a satellite, and an aircraft), an orbit type (a low earth orbit, a middle earth orbit, and a high earth orbit), and a distance from the ground.

For example, a correspondence between the network device related information and the target value of the TA parameter may be preconfigured or preset. If the TA related information in the first information comprises network device related information, a target value of a TA parameter that corresponds to the network device related information may be found based on a correspondence between the network device related information and the target value of the TA parameter.

As shown in Table 2, the network device related information may correspond to target values of one or more TA parameters. Target values of some TA parameters that are not indicated may be preconfigured or preset. For example, if network device related information 1 only corresponds to a target value 1 of the first numerical value in the target values of the TA parameters, target values of other TA parameters such as a target value 1 of the first granularity may be preconfigured or preset.

TABLE 2

| Network device related information | Target values of TA parameters |
| --- | --- |
| Network device related information 1, for example, LEO 600 | at least one of a target value 1 of the TA value, a target value 1 of the first numerical value, a target value 1 of the first granularity, a target value 1 of the first scale factor, a target value 1 of the first reference granularity, a target value 1 of the first subcarrier spacing, a target value 1 of the second subcarrier spacing, a target value 1 of the first scale numerical value, and a target value 1 of the first reference numerical value. |
| Network device related information 2, for example, LEO 1200 | at least one of a target value 2 of the TA value, a target value 2 of the first numerical value, a target value 2 of the first granularity, a target value 2 of the first scale factor, a target value 2 of the first reference granularity, a target value 2 of the first subcarrier spacing, a target value 2 of the second subcarrier spacing, a target value 2 of the first scale numerical value, and a target value 2 of the first reference numerical value. |
| Network device related information 3, for example, GEO | at least one of a target value 3 of the TA value, a target value 3 of the first numerical value, a target value 3 of the first granularity, a target value 3 of the first scale factor, a target value 3 of the first reference granularity, a target value 3 of the first subcarrier spacing, a target value 3 of the second subcarrier spacing, a target value 3 of the first scale numerical value, and a target value 3 of the first reference numerical value. |

Alternatively, in an embodiment of the present application, the network device related information may also indirectly correspond to the target value of the TA parameter through other parameters. For example, the network device related information may first correspond to a certain identifier, and then the identifier corresponds to the target value of the TA parameter. As another example, the network device related information may first correspond to a numerical value used to calculate a TA, and then the numerical value corresponds to the target value of the TA parameter.

Alternatively, in an embodiment of the present application, the TA related information comprises frequency point information, and the frequency point information indicates the target value of the TA parameter.

Alternatively, in an embodiment of the present application, the frequency point information comprises a frequency point value or a frequency point range.

For example, referring to Table 2 below, a correspondence between frequency point information and a target value of a TA parameter may be preconfigured or preset. Target values of some TA parameters that are not indicated may be preconfigured or preset. For example, if Table 3 contains only a target value of the first numerical value, target values of other TA parameters may be preconfigured or preset.

TABLE 3

| Frequency point information | Target values of TA parameters |
|---|---|
| Frequency point range 1, for example, [0~frequency 1) Hz | at least one of a target value 1 of the TA value, a target value 1 of the first numerical value, a target value 1 of the first granularity, a target value 1 of the first scale factor, a target value 1 of the first reference granularity, a target value 1 of the first subcarrier spacing, a target value 1 of the second subcarrier spacing, a target value 1 of the first scale numerical value, and a target value 1 of the first reference numerical value. |
| Frequency point range 2, for example, [frequency 1~frequency 2) Hz | at least one of a target value 2 of the TA value, a target value 2 of the first numerical value, a target value 2 of the first granularity, a target value 2 of the first scale factor, a target value 2 of the first reference granularity, a target value 2 of the first subcarrier spacing, a target value 2 of the second subcarrier spacing, a target value 2 of the first scale numerical value, and a target value 2 of the first reference numerical value. |
| Frequency point range 3, for example, [frequency 2~frequency 3] Hz | at least one of a target value 3 of the TA value, a target value 3 of the first numerical value, a target value 3 of the first granularity, a target value 3 of the first scale factor, a target value 3 of the first reference granularity, a target value 3 of the first subcarrier spacing, a target value 3 of the second subcarrier spacing, a target value 3 of the first scale numerical value, and a target value 3 of the first reference numerical value. |

Alternatively, in an embodiment of the present application, the TA related information comprises at least one identifier, and the identifier has a target value of a corresponding TA parameter.

For example, a parameter 1 indicates an identifier, and the identifier corresponds to a target value of the TA parameter. Referring to Table 4 below, a correspondence between an identifier and a target value of a TA parameter may be preconfigured or preset. Target values of some TA parameters that are not indicated may be preconfigured or preset. For example, if Table 3 contains only a target value of the first numerical value, target values of other TA parameters may be preconfigured or preset.

TABLE 4

| Identifier | Target values of TA parameters |
|---|---|
| Identifier 1 | at least one of a target value 1 of the TA value, a target value 1 of the first numerical value, a target value 1 of the first granularity, a target value 1 of the first scale factor, a target value 1 of the first reference granularity, a target value 1 of the first subcarrier spacing, a target value 1 of the second subcarrier spacing, a target value 1 of the first scale numerical value, and a target value 1 of the first reference numerical value. |
| Identifier 2 | at least one of a target value 2 of the TA value, a target value 2 of the first numerical value, a target value 2 of the |

TABLE 4-continued

| Identifier | Target values of TA parameters |
|---|---|
| | first granularity, a target value 2 of the first scale factor, a target value 2 of the first reference granularity, a target value 2 of the first subcarrier spacing, a target value 2 of the second subcarrier spacing, a target value 2 of the first scale numerical value, and a target value 2 of the first reference numerical value. |
| Identifier 3 | at least one of a target value 3 of the TA value, a target value 3 of the first numerical value, a target value 3 of the first granularity, a target value 3 of the first scale factor, a target value 3 of the first reference granularity, a target value 3 of the first subcarrier spacing, a target value 3 of the second subcarrier spacing, a target value 3 of the first scale numerical value, and a target value 3 of the first reference numerical value. |

Referring to examples in the tables above, the left columns of the tables represent candidate values of the TA related information, and these candidate values may be preconfigured or preset. The right columns of the tables represent target values of TA parameters that are indicated by candidate TA related information. For example, candidate values of the TA related information in Table 2 include: the network device related information 1, the network device related information 2, and the network device related information 3. Candidate values of the TA related information in Table 3 include: the frequency point range 1, the frequency point range 2, and the frequency point range 3. Candidate values of the TA related information in Table 4 include: the identifier 1, the identifier 2, and the identifier 3. For example, TA related information may be selected from a plurality of candidate values, and the selected TA related information may be sent to the terminal through the first information. After receiving the first information, the terminal can obtain the TA related information such as frequency point information 1. Then, a target value of a TA parameter, such as a target value 1 of the first numerical value, that corresponds to the frequency point information 1 may be found in a correspondence between frequency point information and a target value of a TA parameter. The correspondence above may be implemented by a one-level correspondence or a multi-level correspondence. For example, a correspondence between frequency point information and a target value of a TA parameter may be comprised in a table. As another example, a correspondence between frequency point information and intermediate information is comprised in a table, and a correspondence between the intermediate information and a target value of a TA parameter is comprised in another table.

Alternatively, in an embodiment of the present application, the TA related information comprises a target value of a TA adjustment parameter. The TA adjustment parameter may be used to adjust the TA used by the terminal for transmission.

Alternatively, in an embodiment of the present application, types of the TA adjustment parameter comprise at least one of the following:
  a TA adjustment value;
  a second numerical value;
  a second granularity;
  a second scale factor;
  a second reference granularity;

a third subcarrier spacing;
a fourth subcarrier spacing;
a second scale numerical value; and
a second reference numerical value.

In the TA adjustment parameters above, the TA adjustment value may represent the length of time for which a TA used in previous transmission needs to be adjusted. For example, the TA adjustment value is a longer or shorter time length than the TA used by the terminal in the previous transmission. The TA adjustment value may be determined based on the second numerical value and the second granularity. The second granularity may represent a time unit of the second numerical value. Alternatively, the second granularity may be determined based on the second scale factor and the second reference granularity. The second scale factor may represent a scale ratio of the second granularity. The second granularity is a scaled time unit of the second reference granularity. The second subcarrier spacing and the third subcarrier spacing may jointly determine the second scale factor. The second reference numerical value and the fourth subcarrier spacing may jointly determine the second reference granularity.

Alternatively, in an embodiment of the present application, the TA adjustment value is related to the second numerical value and/or the second granularity. The second numerical value may be an integer.

Alternatively, in an embodiment of the present application, the second granularity comprises a second time unit.

Alternatively, in an embodiment of the present application, the second granularity represents a time unit of the second numerical value.

Alternatively, in an embodiment of the present application, the second time unit may be related to a subcarrier spacing.

Specifically, different subcarrier spacings may have different granularities, and different granularities correspond to different time units respectively.

Alternatively, in an embodiment of the present application, the second granularity is related to the second scale factor and/or the second reference granularity.

Alternatively, in an embodiment of the present application, the second scale factor is related to the second scale numerical value and/or the third subcarrier spacing.

Alternatively, in an embodiment of the present application, the second reference granularity is related to the second reference numerical value and/or the fourth subcarrier spacing.

Alternatively, the first subcarrier spacing, the second subcarrier spacing, the third subcarrier spacing, and the fourth subcarrier spacing may be the same, or partially the same, or different from each other.

Alternatively, in an embodiment of the present application, the TA adjustment value comprises a positive value, a negative value, or 0.

Alternatively, whether the TA adjustment value comprises a negative value may be indicated by the base station. For example, the TA adjustment value is indicated in an RAR, and an RAR comprising a negative value and an RAR not comprising a negative value are different types of RARs. The RAR may carry a type identifier. The terminal determines, based on the type identifier, whether the TA adjustment value comprises a negative value.

Alternatively, whether the TA adjustment value comprises a negative value may be preset.

Alternatively, in an embodiment of the present application, when a first condition is met, the TA adjustment value comprises a positive value or 0. For example, when the first condition is met, the TA adjustment value $\Delta_{TA}=N1 \times G1$, where N1 is the second numerical value, and G1 is the second granularity. G1 is related to a subcarrier spacing. Alternatively, the second granularity is related to the second reference granularity, for example, $G1=c1 \times G_{ref1}$, where c1 is the second scale factor, and the scale factor is determined based on the third subcarrier spacing; and $G_{ref1}$ is the second reference granularity, and the reference granularity is determined based on the fourth subcarrier spacing. Alternatively, N1 may be an integer, and a range thereof is 0 to M.

Alternatively, in an embodiment of the present application, the first condition is: the TA is related to the first information. For example, the TA is determined by the terminal based on a TA related message from the base station, which indicates that the TA is related to the first information.

Alternatively, in an embodiment of the present application, when a second condition is met, the TA adjustment value comprises a positive value, a negative value, or 0. For example, when the second condition is met, the TA adjustment value $\Delta_{TA}=(N2-M/2) \times G2$, where N2 is the second numerical value, and G2 is the second granularity. G2 is related to a subcarrier spacing. Alternatively, the second granularity is related to the second reference granularity, for example, $G2=c2 \times G_{ref2}$, where c2 is the second scale factor, and the scale factor is determined based on the third subcarrier spacing; and $G_{ref2}$ is the second reference granularity, and the reference granularity is determined based on the fourth subcarrier spacing. Alternatively, N2 may be an integer, and a range thereof is 0 to M.

Alternatively, in an embodiment of the present application, a range of the second numerical value is from 0 to M, where $M=a \times 3846$, a is a positive integer, for example, a=1 to 8.

Alternatively, in an embodiment of the present application, the second condition is: the TA is related to second information. For example, the TA is determined by the terminal based on a TA related message obtained by the terminal itself, which indicates that the TA is related to the second information.

It can be seen from the description above that the TA adjustment value may have different value ranges under different conditions. For example, when the TA used by the terminal for transmission is determined based on the first information from the network device, the first condition is met, and the TA adjustment value conforms to a first range. When the TA used by the terminal for transmission is determined based on the second information obtained by the terminal itself, the second condition is met, and the TA adjustment value is within a second range. The first range comprises a positive value and 0, and the second range comprises a positive value, a negative value, and 0.

Moreover, according to the information received by the terminal and the selection of the terminal itself, it can be determined that which condition is met: In one case, the terminal uses the first information provided that the terminal receives the first information sent by the network device, and the first condition is met in this case. In another case, although the terminal receives the first information sent by the network device, the terminal may still choose to use the first information or the second information. If the terminal choose to use the first information, the first condition is met. If the terminal choose to use the second information, the second condition is met. In another case, the terminal has only the second information, and no first information is received, so that the second condition is met.

Alternatively, a target value of the second numerical value in the TA adjustment parameters may be an integer N1 or N2 selected from 0 to M for calculating the TA adjustment value, or the target value of the second numerical value may be (N2−M/2). According to the first condition or the second condition described above, $\Delta_{TA}$ may be calculated with a corresponding formula. Further, $\Delta_{TA}$ may be used to calculate the target value of the TA value.

Alternatively, in an embodiment of the present application, the second numerical value and the first numerical value may be the same or may also be different.

In an embodiment of the present application, a method for indicating the TA adjustment parameter is similar to the method for indicating the TA parameter, and examples are as follows.

Manner I: The TA related information acquired by the terminal comprises at least one of target values of the TA adjustment parameters described above. For example, in the first information sent by the network device to the terminal device, the TA related information comprises any one or more of the target values of the TA adjustment parameters described above, and a target value of a TA adjustment parameter that is not indicated may be a preconfigured or preset value.

Manner II: The TA related information acquired by the terminal indicates at least one of target values of the TA adjustment parameters described above. For example, the TA related information comprises an identifier, the target value of the TA adjustment parameter that corresponds to the identifier may be obtained based on a correspondence between the identifier and the target value of the TA adjustment parameter. Target values of TA adjustment parameters that are not indicated may be preconfigured or preset values.

Alternatively, in an embodiment of the present application, the method further comprises: updating, by the terminal, the TA based on the TA adjustment value.

Alternatively, in an embodiment of the present application, said updating, by the terminal, the TA based on the TA adjustment value comprises: obtaining a second TA based on a first TA and the TA adjustment value. The first TA may be a TA used by the terminal for the last transmission, and the second TA may be an updated TA used by the terminal for a next transmission.

Alternatively, in an embodiment of the present application, the first TA may be a current TA, and the second TA may be an updated TA (a target value of the TA value). For example, if the current TA is $TA_{old}$, the adjustment value is $\Delta_{TA}$, and the updated TA is $TA_{new}$, $TA_{new}=TA_{old}+\Delta_{TA}$.

Alternatively, in an embodiment of the present application, the method further comprises: determining, by the terminal, a TA corresponding to a target BWP based on TA related information corresponding to the target BWP to which the terminal is to be handed over. For example, a current activated BWP is a BWP1, the target BWP is a BWP2, and a TA corresponding to the BWP2 may be determined based on TA related information such as a subcarrier spacing of the BWP2.

Alternatively, in an embodiment of the present application, the method further comprises: determining, by the terminal, the TA corresponding to the target BWP by using a TA corresponding to a current activated BWP, a delay parameter corresponding to the current activated BWP, and a delay parameter corresponding to the target BWP to which the terminal is to be handed over. For example, the current activated BWP is the BWP1, the target BWP is the BWP2, and the delay parameter is a time offset K_offset. If the BWP1 corresponds to a time offset K_offset1, the BWP2 corresponds to a time offset K_offset2, the TA corresponding to the BWP2 may be determined based on a TA and the K_offset1 corresponding to the BWP1 and the K_offset2 corresponding to the BWP2.

Alternatively, in an embodiment of the present application, the delay parameter is related to at least one of the following:
the TA used by the terminal for transmission;
a data processing delay (Processing time);
a channel transmission delay (Channel Propagation Time);
a round trip time (RTT); and
a transmission resource allocation.

For example, the resource allocation may include at least one of the following:
a time domain resource allocation;
a time domain resource assignment;
a frequency domain resource allocation; and
a frequency domain resource assignment.

Alternatively, in an embodiment of the present application, the current activated BWP and the target BWP are uplink BWPs.

Alternatively, in an embodiment of the present application, it is assumed that target values of the first subcarrier spacing and/or the second subcarrier spacing are not indicated in the TA parameter in the first information. For example, the target value of the second subcarrier spacing may be predefined. In an initial access scenario, the target value of the first subcarrier spacing may correspond to a subcarrier spacing of an initial uplink BWP. In a BWP handover scenario, the target value of the first subcarrier spacing may correspond to a subcarrier spacing of an activated uplink BWP. If handover of the activated uplink BWP occurs, the target value of the first subcarrier spacing may change to a subcarrier spacing of an activated uplink BWP after the handover.

Alternatively, in an embodiment of the present application, it is assumed that target values of the third subcarrier spacing and/or the fourth subcarrier spacing are not indicated in the TA adjustment parameter in the first information. For example, the target value of the fourth subcarrier spacing may be predefined. In an initial access scenario, the target value of the third subcarrier spacing may correspond to a subcarrier spacing of an initial uplink BWP. In a BWP handover scenario, the target value of the third subcarrier spacing may correspond to a subcarrier spacing of an activated uplink BWP. If handover of the activated uplink BWP occurs, the target value of the third subcarrier spacing may change to a subcarrier spacing of an activated uplink BWP after the handover.

With regard to specific explanations and examples of the first subcarrier spacing, the second subcarrier spacing, the third subcarrier spacing, and the fourth subcarrier spacing, references can be made to related descriptions in the embodiments described above, which will not be repeatedly described herein.

Alternatively, in an embodiment of the present application, said acquiring, by a terminal, TA related information in S210 comprises: acquiring, by the terminal, second information which comprises the TA related information.

Alternatively, in an embodiment of the present application, said acquiring, by the terminal, the second information comprises: obtaining, by the terminal itself, the second information. The second information may be not from the base station. For example, the second information acquired by the terminal from a global positioning system (GPS) is a distance from the terminal to a satellite. The distance may be different from the distance carried in the first information.

Alternatively, in an embodiment of the present application, the TA related information in the second information comprises a location of the terminal and/or information of the network device.

Alternatively, in an embodiment of the present application, the information of the network device may comprise a location of the network device, for example, coordinate data of a satellite.

Alternatively, in an embodiment of the present application, said performing, by the terminal, transmission based on the TA in S220 comprises: performing, by the terminal, transmission in an uplink frame based on the TA.

Alternatively, in an embodiment of the present application, a start point of the uplink frame is earlier than that of a downlink frame corresponding to the uplink frame, and the length of the advanced time is the TA or a calculation result of the TA and an offset. For example, the offset may be a preset value that is related to a cell, a fixed value for cell synchronization that cannot be modified, etc. For example, the length of the advanced time is equal to the TA, or the sum of the TA and the offset.

Alternatively, in an embodiment of the present application, the uplink frame and the downlink frame are at the terminal side.

Alternatively, in an embodiment of the present application, the terminal may perform at least one of PRACH, PUSCH, SRS, and PUCCH transmissions in the uplink frame based on the TA.

Alternatively, in an embodiment of the present application, said performing, by the terminal, transmission based on the TA comprises: sending, by the terminal, third information based on the TA, wherein the third information comprises the TA related information. For example, the terminal may send the third information in the uplink frame through a PRACH, a PUSCH, an SRS, or a PUCCH.

Alternatively, in an embodiment of the present application, when the third information is transmitted in the PRACH, the third information is represented by a random access preamble index and/or a resource location of a PRACH occasion. The random access preamble index and/or the resource location of the PRACH occasion may represent a target value of a TA value or a range of the target value.

For example, the preamble index is 0 to 31, which indicates that the range of the target value of the TA value is from 0 ms to 20 ms; and the preamble index is 32 to 63, which indicates that the range of the target value of the TA value is above 20 ms. As another example, the first ten resources of the PRACH occasion (abbreviated as resources) indicate that the range of the target value of the TA value is from 0 ms to 20 ms, and the last ten resources indicate that the range of the target value of the TA value is above 20 ms. As another example, preamble indexes sent in the first ten resources are 0 to 31, which indicates that the range of the target value of the TA value is from 0 to 5 ms; preamble indexes sent in the first ten resources are 32 to 63, which indicates that the range of the target value of the TA value is from 5 ms to 10 ms; preamble indexes sent in the last ten resources are 0 to 31, which indicates that the range of the target value of the TA value is from 10 ms to 15 ms; and preamble indexes sent in the last ten resources are 32 to 63, which indicates that the range of the target value of the TA value is above 15 ms.

Alternatively, in an embodiment of the present application, the TA related information in the third information comprises a range of the target value of the TA parameter. For example, the range of the target value of the TA parameter in the third information may comprise a range of a TA value used for transmitting the third information or a range of the first numerical value.

Alternatively, in an embodiment of the present application, the third information is carried in a message 3 in a random access process. For example, the message 3 may be transmitted in the PUSCH, and resources of the PUSCH may be allocated by an RAR or in a DCI format 0-0. CRC scrambling may be performed on the PUSCH by using a TC-RNTI.

Alternatively, in an embodiment of the present application, the TA related information in the third information comprises a target value of a TA parameter, for example, a target value of a TA value or a target value of a first numerical value.

Figure 3:
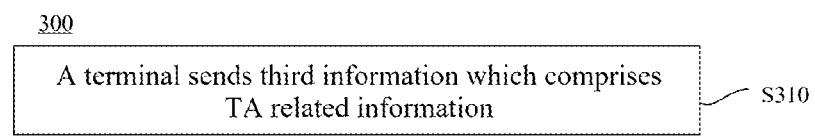
FIG. 3 is a schematic flowchart of a transmission method according to another embodiment of the present application.

FIG. 3 is a schematic flowchart of a transmission method 300 according to one embodiment of the present application. Alternatively, the method may be applied to the system shown in FIG. 1, but is not merely limited thereto. The method may be applied to an NTN system. The method comprises at least part of the followings.

S310, sending, by a terminal, third information which comprises TA related information. The TA related information is used to indicate a TA used for transmitting the third information.

Alternatively, in an embodiment of the present application, the third information is transmitted in an uplink frame. For example, the terminal sends the uplink frame to a base station, and the uplink frame comprises the third information.

Alternatively, in an embodiment of the present application, a start point of the uplink frame is earlier than that of a downlink frame corresponding to the uplink frame, and the length of the advanced time is the TA or a calculation result of the TA and an offset. For example, the length of the advanced time is equal to the TA, or the sum of the TA and the offset.

Alternatively, in an embodiment of the present application, the uplink frame and the downlink frame are at the terminal side.

Alternatively, in an embodiment of the present application, the third information is transmitted in at least one of a PRACH, a PUSCH, an SRS, and a PUCCH.

Alternatively, in an embodiment of the present application, when the third information is transmitted in the PRACH, the third information is represented by a random access preamble index and/or a resource location of a PRACH occasion.

Alternatively, in an embodiment of the present application, the third information is carried in a message 3 in a random access process.

Alternatively, in an embodiment of the present application, the TA related information in the third information comprises a target value of a TA parameter or a range of the target value.

For example, the random access preamble index and/or the resource location of the PRACH occasion represents ranges of target values of one or more TA parameters. As another example, the message 3 comprises target values of one or more TA parameters or ranges of the target values.

Alternatively, in an embodiment of the present application, with regard to types of the TA parameter, the target value of the TA parameter, the range of the target value, references can be made to related descriptions of the embodiment of the transmission method described above.

A specific process of carrying out the method 300 by the terminal in this embodiment has the same meaning as the same description in the method 200 described above. For example, with regard to a specific explanation and example of the TA parameter, references can be made to related descriptions of the embodiment of the transmission method described above. For brevity, details are not repeatedly described herein.

Figure 4:
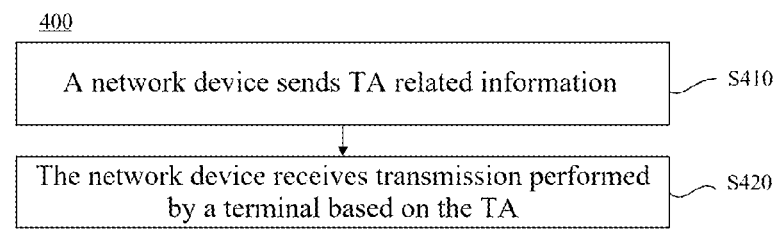
FIG. 4 is a schematic flowchart of a transmission method according to another embodiment of the present application.

FIG. 4 is a schematic flowchart of a transmission method 400 according to one embodiment of the present application. Alternatively, the method may be applied to the system shown in FIG. 1, but is not merely limited thereto. The method may be applied to an NTN system. The method comprises at least part of the followings.

S410, sending, by a network device, timing advance (TA) related information. The TA related information is used to indicate a TA used by the terminal for transmission.

S420, receiving, by the network device, transmission performed by the terminal based on the TA.

Alternatively, in an embodiment of the present application, said sending, by a network device, TA related information comprises:

sending, by the network device, first information which comprises the TA related information.

Alternatively, in an embodiment of the present application, the first information is carried in system information.

Alternatively, in an embodiment of the present application, the system information comprises at least one of the following: a SIBx, where x is a positive integer greater than or equal to 1; and an MIB.

Alternatively, in an embodiment of the present application, the first information is carried in a random access response RAR.

Alternatively, in an embodiment of the present application, the first information is carried in an RRC message. Specifically, a plurality of IEs in the RRC messages may comprise the TA related information, and with regard to examples of IEs in the RRC message, references can be made to related descriptions of the embodiments of the transmission methods described above.

Alternatively, in an embodiment of the present application, the first information is carried in a MAC-CE.

Alternatively, in an embodiment of the present application, the first information is carried in DCI.

Alternatively, in an embodiment of the present application, the TA related information comprises a target value of a TA parameter, and the target value of the TA parameter is used to indicate the TA used by the terminal for transmission. With regard to types, meanings, and examples of the TA parameter, and manners of obtaining the target value of the TA parameter based on the TA related information, references can be made to related descriptions of the embodiments of the transmission methods described above.

Alternatively, in an embodiment of the present application, the TA related information comprises a target value of a TA adjustment parameter. With regard to types, meanings, and examples of the TA adjustment parameter, and manners of obtaining the target value of the TA adjustment parameter based on the TA related information, references can be made to related descriptions of the embodiments of the transmission methods described above.

Alternatively, in an embodiment of the present application, the second information is information obtained by the terminal itself. The terminal obtains the second information by itself to carry out a process of determining the TA for its own transmission. References can be made to related descriptions of the embodiments of the transmission methods described above.

Alternatively, in an embodiment of the present application, said receiving, by the network device, transmission performed by the terminal based on the TA comprises:

receiving, by the network device, transmission performed by the terminal in an uplink frame based on the TA.

Alternatively, in an embodiment of the present application, a start point of the uplink frame is earlier than that of a downlink frame corresponding to the uplink frame, and the length of the advanced time is the TA or a calculation result of the TA and an offset.

Alternatively, in an embodiment of the present application, the uplink frame and the downlink frame are at the terminal side.

Alternatively, in an embodiment of the present application, the transmission comprises at least one of PRACH, PUSCH, SRS, and PUCCH transmissions.

Alternatively, in an embodiment of the present application, the transmission comprises sending third information which comprises the TA related information.

Alternatively, in an embodiment of the present application, when the third information is transmitted in a PRACH, the third information is represented by a random access preamble index and/or a resource location of a PRACH occasion.

Alternatively, in an embodiment of the present application, the TA related information in the third information comprises a target value of a TA parameter or a range of the target value.

Alternatively, in an embodiment of the present application, the third information is carried in a message 3 in a random access process.

With regard to a specific process of carrying out the method 400 by the network device in this embodiment, references can be made to related descriptions about the network device such as a base station in the method 200 described above, which will not be repeatedly described herein for brevity.

Figure 5:
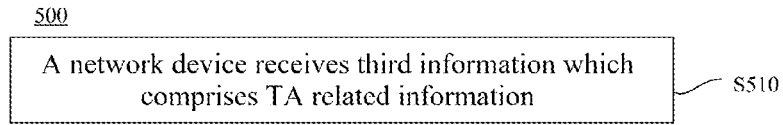
FIG. 5 is a schematic flowchart of a transmission method according to another embodiment of the present application.

FIG. 5 is a schematic flowchart of a transmission method 500 according to one embodiment of the present application. Alternatively, the method may be applied to the system shown in FIG. 1, but is not merely limited thereto. The method may be applied to an NTN system. The method comprises at least part of the followings.

S510, receiving, by a network device, third information which comprises TA related information. The TA related information is used to indicate a TA used for transmitting the third information.

Alternatively, in an embodiment of the present application, the third information is transmitted in an uplink frame.

Alternatively, in an embodiment of the present application, a start point of the uplink frame is earlier than that of a downlink frame corresponding to the uplink frame, and the length of the advanced time is the TA or a calculation result of the TA and an offset.

Alternatively, in an embodiment of the present application, the uplink frame and the downlink frame are at the terminal side.

Alternatively, in an embodiment of the present application, the third information is transmitted in at least one of a PRACH, a PUSCH, an SRS, and a PUCCH.

Alternatively, in an embodiment of the present application, when the third information is transmitted in the PRACH, the third information is represented by a random access preamble index and/or a resource location of a PRACH occasion.

Alternatively, in an embodiment of the present application, the TA related information in the third information comprises a target value of a TA parameter or a range of the target value.

Alternatively, in an embodiment of the present application, the third information is carried in a message 3 in a random access process.

Alternatively, in an embodiment of the present application, with regard to types, meanings, and examples of the TA parameter, and manners of obtaining the target value of the TA parameter based on the TA related information, references can be made to related descriptions of the embodiments of the transmission methods described above.

With regard to a specific process of carrying out the method 500 by the network device in this embodiment, references can be made to related descriptions about the network device such as a base station in the methods 200 and 300 described above, which will not be repeatedly described herein for brevity.

The transmission methods in the embodiments of the present application is described below by taking an NTN as an example.

An inaccurate TA may cause many problems, which includes that a base station cannot receive uplink transmission correctly, uplink transmission of a terminal may cause interference to uplink transmission of other terminals, and even in some TDD cases, downlink transmission may also be affected. Under the environment of an ultra-long point-to-point distance and an ultra-high speed for the NTN, an accurate TA can be provided through the transmission methods in the embodiments of the present application.

Figure 6:
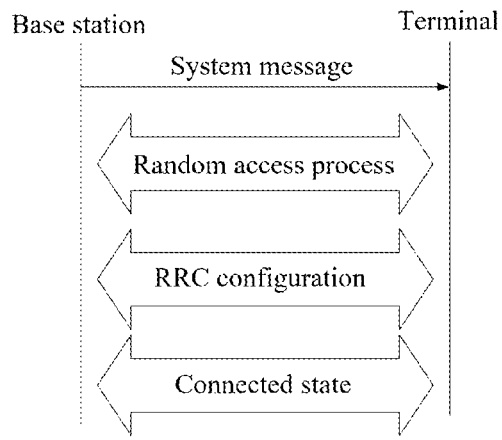
FIG. 6 is a schematic diagram of a connection process between a base station and a terminal.

In an example, as shown in FIG. 6, in an NTN system, a terminal may first receive a system message sent by a base station. Then, a random access process is performed. Finally, the terminal is connected to a network (connected state). The terminal is in an initial access state before entering the connected state. In the transmission methods of the embodiments of the present application, starting from the initial access state and continuing to the connected state, manners of determining a TA may be set.

I. UE in Initial Access Stage

A UE first receives system information in an initial access stage. The system information may comprise TA related information. For example, the TA related information indicates a target value of a TA value. The target value of the TA value may be related to the following factors: The target value is related to a distance from the base station to a point in a cell, wherein the point may be the farthest point of the cell relative to the base station, or may be a certain point. The TA value may be used by a UE wishing to access the cell, or may be used by all UEs in the cell (including UEs (initial access UE) wishing to access the cell and UEs (connected UE) that have accessed the cell).

In the initial access stage, the UE may determine a to-be-used TA based on TA related information carried in system messages such as RMSI, a SIBx, and an MIB. Specific examples are as follows:

Manner I: the TA related information is informed in a SIB1, wherein the SIB1 comprises target values of one or more TA parameters. A target value of each TA parameter may be selected from several preset values. With regard to examples of the TA parameter and the target value thereof, references can be made to related descriptions of the embodiments described above.

For example, TA=N×G, where N represents a first numerical value, G represents a first granularity, and G is related to a subcarrier spacing. Alternatively, the first granularity is related to a first reference granularity, for example, $G=c \times G_{ref}$, where c is a first scale factor, and the scale factor is determined based on a first subcarrier spacing; and $G_{ref}$ is the first reference granularity, and the reference granularity is determined based on a second subcarrier spacing.

As another example, $$G = c * G_{ref}, c = \frac{M1}{2^\mu},,$$

where M1 is a first scale numerical value, $2^\mu$ is 2 raised to the power of µ, and µ is related to the first subcarrier spacing.

As another example, $$G = c * G_{ref}, = \frac{M1}{2^\mu}, \mu = 0, 1, 2, 3, 4; G_{ref} = \frac{1}{\Delta f * M2},$$

where ∆f represents the second subcarrier spacing. For example, when ∆f =480 kHz, $$G_{ref} = \frac{1}{480 \text{ kHz} * M2},$$

where M1 is the first scale numerical value, and M2 is a first reference numerical value.

Manner II: the TA related information is informed in a SIB1, wherein the TA related information comprised in the SIB1 is network device related information.

For example, the network device related information is related to satellite deployment of the NTN system. For example, satellite deployment such as an LEO 600, an LEO 1200, an LEO 5000, and a GEO is indicated through the network device related information. Each different satellite deployment corresponds to a target value of a preset TA parameter. The target value of the TA parameter is indicated through indication of the satellite deployment in the NTN.

As another example, the network device related information indicates some information related to a satellite, for example, a distance from an orbit to the ground. The UE determines the target value of the TA parameter based on the information. Specifically, the target value of the TA parameter may be determined based on a distance from the base station to the UE. A relationship between the distance and the target value of the TA parameter may be preset. Determination may also be performed according to a conventional physical relationship, for example, TA=RTT=2×D/v, where D represents a distance, and v represents a speed of light. In the formula above, D may represent the distance indicated by the network device related information. The distance indicated by the network device related information is not necessarily an actual distance from the base station to the terminal, but a distance from the base station to the nearest point or the farthest point in the cell.

Manner III: the TA related information is informed in a SIB1, wherein the TA related information comprised in the SIB1 is frequency point information. A frequency represented by the TA related information may be a frequency of a cell. As shown in Table 5 below, in a preset table, there is a correspondence between a frequency point range and a target value of a TA parameter such as a target value of a TA value. The frequency point information in the SIB1 may correspond to a target value of a TA value. For example, a frequency point range 1 corresponds to a TA value 1. A frequency point value in a range 3 corresponds to a TA value 3.

TABLE 5

| Frequency point range 1, for example, [0~frequency 1) Hz | TA value 1 |
|---|---|
| Frequency point range 2, for example, [frequency 1~frequency 2) Hz | TA value 2 |
| Frequency point range 3, for example, [frequency 2~frequency 3] Hz | TA value 3 |

Manner IV: the terminal obtains second information by itself, wherein the second information comprises the TA related information. Some terminals have a GPS capability, for example, a global navigation satellite system (GNSS) UE. Such a terminal can estimate a distance from the terminal to a satellite based on data broadcast by the GPS. In this way, a TA obtained by the terminal may be an estimated TA value or a range of a TA value. For example, the TA value may be obtained by using the following formula: TA=RTT=2×D1/v, where D1 represents a distance from the terminal to a satellite, and v represents a speed of light.

In this manner, it may be further set that: if the base station does not add the TA related information to a system message (for example, the SIB1), the terminal needs to estimate the target value of the TA value or the range of the target value of the TA value. For example, if the system message received by the terminal does not comprise the TA related information, the terminal obtains a distance from the terminal to a satellite from the GPS or other positioning system by itself, so as to estimate the target value of the TA value or the range of the target value of the TA value.

Moreover, in this manner, even if the system message received by the terminal comprises the TA related information, the terminal may also choose whether to use the TA determined based on the received TA related information or the TA determined based on the TA related information obtained by the terminal itself.

II. UE in Random Access Process

Figure 7:
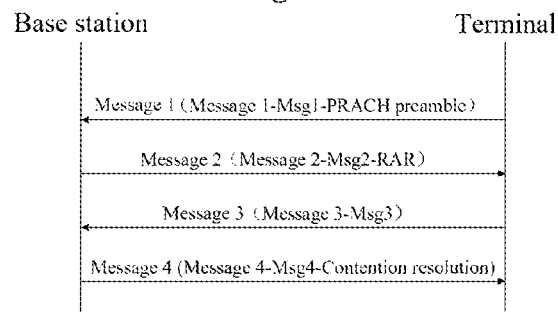
FIG. 7 is a schematic diagram of a random access process.

If the UE determines the TA in the initial access stage, the UE can use the TA in a random access process. If the UE does not determine the TA in the initial access stage, the UE can determine and use the TA in the random access process. For example, as shown in FIG. 7, the TA may be determined and/or used in various stages of the random access process:

(I) Message 1: The message 1 may comprise a time domain resource, a frequency domain resource, a random access preamble, and an index thereof. The terminal may send the message 1 through the random access preamble. Time and frequency domain resources that can be used to send the preamble are resources of a PRACH occasion. After receiving a preamble on a resources of the PRACH occasion, the base station may obtain an index of the preamble, and perform signal processing on the preamble to obtain a TA.

Figure 8:
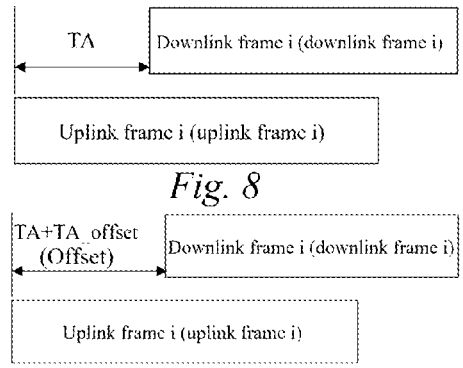
FIG. 8 is a schematic diagram of a TA-based transmission.

The terminal needs to consider the TA when sending the message 1. For example, as shown in FIG. 8, the message 1 is in uplink transmission, and the length of the advanced time of a start point of the uplink frame relative to a start point of its corresponding downlink frame may be equal to the TA. The uplink frame and its corresponding downlink frame are at the terminal side. That is, for the same frame number, the length of the advanced time of the uplink frame relative to the downlink frame is equal to the TA. A composition of the TA may be an integer number of granularities, for example, TA=N×G, where N is an integer, and G is a granularity. The granularity G may represent a time unit of N. The granularity may be a spacing between sampling points in time domain, and the spacing between sampling points may be related to a subcarrier spacing and a system sampling frequency. The granularity may also be related to other preset parameters related to the subcarrier spacing. A subcarrier spacing of the terminal in the initial access state may be a subcarrier spacing between initial bandwidth parts.

Figure 9:
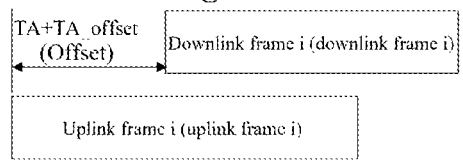
FIG. 9 is a schematic diagram of a TA and offset-based transmission.

As shown in FIG. 9, in some systems, a TA difference between a downlink frame and an uplink frame may comprise an offset (TA_offset), and the offset may be indicated in the system message.

Therefore, when the terminal sends the message 1, the terminal sends the message in the uplink frame, and in this case, the TA and/or the TA_offset need to be considered when the uplink frame is sent.

Moreover, when the terminal estimates the TA by itself (referring to Manner IV in the initial access stage above), the UE needs to notify the base station of a range of the target value of the TA parameter, such as the target value of the TA value or a target value of the first numerical value, that is estimated by the UE. The range of the target value of the TA parameter may be related to the message 1 in the random access process. The message 1 may comprise the time domain resource, the frequency domain resource, the random access preamble, and the index thereof. The time and frequency domain resources may determine a random access occasion (RACH occasion, RO). The base station may configure a plurality of ROs and RACH preambles, and different combinations of ROs and RACH preambles may represent ranges of target values of different TA parameters. The UE sends the message 1 by selecting a preset combination of an RO and an RACH preamble, so as to inform the base station of the range of the target value of the TA parameter that is estimated by the terminal.

Similarly, in the initial access stage above, although the base station indicates the TA related information in the system message, but the UE is still allowed to determine to use the TA determined based on the TA related information indicated by the base station or the TA determined based on the TA related information obtained by the UE itself. Therefore, the UE can inform, in the message 1, the base station of whether the UE uses the TA indicated by the base station or the TA estimated by itself. It should be noted that if the TA estimated by the UE is an absolute time, the time needs to be finally converted to an integer number of granularities.

(II) Message 2: The message 2 may be sent through an RAR.

The terminal receives the message 2. The message 2 may comprise a TA adjustment parameter, and the parameter is related to the TA. Several implementations are as follows:

Manner I: Adjustment information of the TA (or referred to modification information of the TA), such as a TA adjustment value $\Delta_{TA}$, is indicated through a parameter. The terminal needs to update the previous TA, that is, $TA_{new}=TA_{old}+\Delta_{TA}$. $\Delta_{TA}$ may be indicated by the parameter. $TA_{old}$ may be a TA used when the terminal sends the message 1.

EXAMPLE 1

$\Delta_{TA}$ is a positive number or 0. $\Delta_{TA}$ may be calculated through the following formula: $\Delta_{TA}=N1 \times G1$. N1 may be an integer, and G1 may be a preset granularity. G1 is related to a subcarrier spacing. A value range of N1 may be 0, 1, 2, 3, 4, . . . , M. There may be a plurality of values for M, for example, M=3846, M=2×3846, or M=3×3846.

It should be noted here that, in addition to $\Delta_{TA}$, a value of the TA may also be obtained in a similar manner TA=N×G, where N is an integer, G is a preset granularity, and G may be the same as or different from G1. A range of N may be larger than the range of N1. G1 is related to a subcarrier spacing. Alternatively, a second granularity is related to a second reference granularity, for example, G1=c1×$G_{ref1}$, where c1 is a second scale factor, and the scale factor is determined based on a third subcarrier spacing; and $G_{ref1}$ is the second reference granularity, and the reference granularity is determined based on the fourth subcarrier spacing.

EXAMPLE 2

$\Delta_{TA}$ is a positive number, a negative number, or 0. $\Delta_{TA}$ may be calculated through the following formula:

$$\Delta_{TA} = \left(N2 - \frac{M}{2}\right) * G2$$

is derived, where N2 is an integer, and G2 is a preset granularity. G2 is related to a subcarrier spacing, and a value range of N2 may be 0, 1, 2, 3, 4, . . . , M. There may be a plurality of values for M, for example, $$M = 3846, M = 2 \times 3846, \text{ or } M = 3 \times 3846. \; N2 \text{ or } \left(N2 - \frac{M}{2}\right)$$

may be indicated in the first information. It should be noted here that a value of G2 in this example may be the same as or different from G and G1 in the example above. A range of N used to determine the TA value may be larger than the range of N2 used to determine the TA adjustment value. G2 is related to a subcarrier spacing. Alternatively, the second granularity is related to the second reference granularity, for example, G2=c2×$G_{ref2}$, where c2 is the second scale factor, and the scale factor is determined based on the third subcarrier spacing; and $G_{ref2}$ is the second reference granularity, and the reference granularity is determined based on the fourth subcarrier spacing.

Alternatively, in the NTN system, whether the message 2 comprises N1 in Example 1 or N2 or $$\left(N2 - \frac{M}{2}\right)$$

in Example 2 may be determined based on whether the UE uses the TA indicated by the system message or the TA obtained through estimation by the UE itself. For example, if the system message indicates the TA, after receiving the RAR, the terminal parses modification of the TA by means of Example 1. If the system message does not indicate the TA, after receiving the RAR, the terminal parses modification of the TA by means of Example 2. As another example, although the system message indicates the TA, the UE uses the TA estimated by itself instead of the TA indicated in the system message, and after receiving the RAR, the terminal parses modification of the TA by means of Example 2.

Manner II: A parameter that can be comprised in the message 2 indicates update information of the TA. For example, the parameter directly indicates a new TA: $TA_{new}$.

(III) Message 3

When the terminal sends the message 3, the terminal may synchronize $TA_{new}$ based on an updated uplink frame. As another example, a time length difference between a start point of the uplink frame and a start point of a downlink frame is equal to $TA_{new}$.

The terminal may inform the base station of the TA related information. For example, the terminal may add $TA_{new}$ to the message 3 and send it to the base station, wherein $TA_{new}$ here is a TA used when the message 3 is sent. The time length difference between the start point of the uplink frame for sending the message 3 and the start point of its corresponding downlink frame is equal to $TA_{new}$. It should be noted that when the terminal sends the message 3, the offset $TA_{offset}$ may be considered or may not be considered. For example, the time length difference between the start point of the uplink frame for sending the message 3 by the UE and the start point of its corresponding downlink frame is equal to $TA_{new}+TA_{offset}$.

The terminal may inform the base station of the TA related information. For example, the terminal may add $TA_{old}$ to the message 3 and send it to the base station, wherein $TA_{old}$ here is a TA used when the message 1 is sent. It should be noted that the TA used when the terminal sends the message 1, the $TA_{offset}$ may be considered or may not be considered. For example, the time length difference between the start point of the uplink frame for sending the message 3 by the terminal and the start point of its corresponding downlink frame is equal to $TA_{old}+TA_{offset}$.

Moreover, conditions for carrying the TA related information in the message 3 may be set. For example, when the terminal does not use the TA related information indicated by the base station, the terminal needs to send the TA related information in the message 3. It should be noted here that a case in which the terminal does not use the TA related information indicated by the base station may be caused by a fact that the base station does not indicate the TA or a fact that the base station indicates the TA but the terminal choose to use the TA estimated by itself.

(IV) Message 4: for example, through a MAC PDU in a PDSCH with a terminal contention resolution identity (MAC PDU in PDSCH with UE contention resolution identity), the base station may send TA update information to the terminal in the message 4. For example, a new TA: $TA_{new}$ is comprised in the message 4. As another example, a TA adjustment value $\Delta_{TA}$ is comprised in the message 4.

In a random access process, the TA related information may be indicated by one or more of the message 1, the message 2, the message 3, and the message 4 described above. TA related information indicated by different messages may be the same, for example, the TA related information may comprise a TA value, frequency point information, satellite deployment, a distance, etc. TA related information indicated by different messages may be different, for example, $TA_{old}$ may be indicated by a message 1; $TA_{new}$ or $\Delta_{TA}$ may be indicated by a message 2; $TA_{new}$, $TA_{old}$, and $TA_{offset}$ may be indicated by a message 3; and $TA_{new}$ or $\Delta_{TA}$ may be indicated by a message 4.

III. RRC configuration

Figure 10:
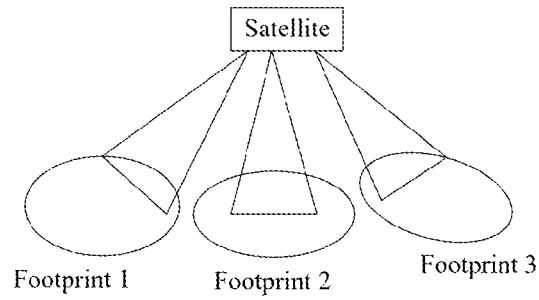
FIG. 10 is a schematic diagram of a footprint.

Before entering the connected state, the UE needs to acquire RRC configuration of the base station. The base station may add the TA related information to an RRC message. In a scenario, the base station in the NTN system can emit a plurality of beams at the same time, and each beam is projected onto the ground to form an area, which can be referred to as a footprint. The plurality of beams emitted by the base station form a plurality of footprints on the ground. As shown in FIG. 10, distances from the terminal to the base station may be different in different footprints. Therefore, the TA required by the terminal may change correspondingly. Examples of configuring, in RRC messages, TA related messages corresponding to different footprints are as follows.

Scenario 1: It is assumed that each footprint represents a cell, and different cells have different cell IDs. In this case, if the serving cell of the terminal is handed over, the base station may indicate a TA related message of a target serving cell to the terminal through an RRC message. A TA value may be carried in a primary serving cell handover command (handover command)

Scenario 2: In this scenario, one cell may emit a plurality of beams to form a plurality of footprints, for example, a footprint 1, a footprint 2, and a footprint 3 in the diagram above, which belong to the same cell. In this way, a TA related message corresponding to each footprint can be indicated in configuration of each footprint, and examples are as follows:

EXAMPLE 1

The base station may indicate the TA related information through a serving cell configuration information element (ServingCellConfig IE). This IE may comprise configuration information of a plurality of footprints, including adding or releasing a footprint ID (Footprint-Id) and configuration information of each footprint.

```
ServingCellConfig ::=      SEQUENCE {
footprint-ToReleaseList    SEQUENCE (SIZE (1..maxNroffootprint)) OF
                           Footprint-Id
footprint-ToAddModList     SEQUENCE (SIZE (1..maxNroffootprint))
                           OF
Footprint-Config
...
}
```

There may be a configuration (Footprint-Config) IE for configuration information of each footprint. This IE may comprise a parameter of a footprint ID, and may further comprise the TA related information, for example, a TA related parameter. The IE may further comprise an uplink configuration IE and/or a downlink configuration IE. A parameter value of the TA related parameter in the IE may not indicate a granularity part, but only indicate an integer part, for example, indicating N, N1, and N2 in the examples above. Alternatively, the TA related parameter may also comprise an integer part and a granularity part, and the granularity is related to a subcarrier spacing. The subcarrier spacing may be configured in the IE, or may be a preset value such as 15 kHz.

```
Footprint-Config ::=    SEQUENCE {
Footprint-ID
TA related parameter
UplinkConfig
...
}
```

In the following example, the subcarrier spacing Reference SCS is also configured in the footprint configuration IE.

```
Footprint-Config ::=    SEQUENCE {
Footprint-ID
TA related parameter
Reference SCS
UplinkConfig
...
}
```

In Example 1, a layer of footprint configuration IE is added below the serving cell configuration IE. Uplink and/or downlink can continue to be configured in the footprint configuration. For example, the footprint configuration IE has an uplink configuration IE and/or a downlink configuration IE. The uplink configuration IE and/or the downlink configuration IE comprise the TA related parameter, or further comprise the Reference SCS. If each beam corresponds to a footprint configuration IE, uplink transmission and downlink transmission may be configured independently in each beam.

EXAMPLE 2

The base station may configure the TA related information such as a TA related parameter in an uplink configuration (UplinkConfig) IE, so that there is no need to add a layer of footprint configuration IE. Therefore, the configuration manner is simple. A parameter value of the TA related parameter comprised in the IE may not indicate a granularity part, but only indicate an integer part, for example, indicating N, N1, and N2 in the examples above. Alternatively, the TA related parameter may also comprise an integer part and a granularity part, and the granularity is related to a subcarrier spacing. The subcarrier spacing may be configured in the IE, or may be a preset value such as 15 kHz.

```
UplinkConfig::= SEQUENCE {
TA related parameter
...
}
```

In the following example, the subcarrier spacing Reference SCS is also configured in the uplink configuration IE

```
UplinkConfig::= SEQUENCE {
TA related parameter
Reference SCS
...
}
```

EXAMPLE 3

The base station may configure a TA related parameter in a bandwidth part (BWP) configuration IE. It is assumed that footprints on the ground that are formed by a plurality of beams of a satellite are sent at different frequencies, wherein different frequencies may be regarded as different frequency domain resources, such as different BWPs. The TA related parameter may also be configured in respective BWP configuration IE. In the following example, the base station puts the TA related parameter in an uplink BWP configuration IE (BWP-Uplink IE). Certainly, the base station may also put the TA related parameter in a downlink BWP configuration IE (BWP-Downlink IE).

```
BWP-Uplink::= SEQUENCE {
bwp-Id
bwp-Common
bwp-Dedicated
TA related parameter
...
}
```

IV. Terminal in connected state
(I) BWP Handover

EXAMPLE 1

When the terminal is in the connected state, BWP handover for the terminal may occur in some scenarios. When uplink BWP handover, for example, handover from a BWP1 to a BWP2, for the terminal is required and if the TA related parameter is configured in a BWP configuration IE (protection point 22), the terminal needs to abandon a TA under the BWP1 and uses a TA under the BWP2 instead. When the TA under the BWP2 is used, the calculation of the TA requires to be based on a subcarrier spacing (SCS) of the BWP2.

EXAMPLE 2

When the terminal is in the connected state, a TA value is not configured in a BWP configuration IE, but the BWP configuration IE is configured with a parameter indirectly related to the TA, for example, this parameter is also related to a round trip time (RTT) (for example, a time offset $K_{offset}$ used for uplink transmission resource assignment). If BWP handover occurs and the time offset changes, the terminal needs to adjust the TA based on a change in the time offset parameter. For example, it is assumed that the terminal is handed over from the BWP1 to the BWP2, $K_{offset1}$ is configured in the BWP1, and $K_{offset2}$ is configured in the BWP2, wherein $K_{offset1}$ is not equal to $K_{offset2}$. The terminal may adjust a new TA value of the terminal on the BWP2 with reference to the following formula: $TA_{bwp2} \sim TA_{bwp1} \times (K_{offset2}/K_{offset1})$.

In the formula, "~" represents a proportional relationship. A main principle of such adjustment comprises: if the offset in the BWP2 increases relative to the offset in the BWP1, which indicates that the RTT also increases, and the corresponding TA value also needs to be increased. Specifically, it is assumed that the TA value is obtained based on TA=N×G. N is an integer, and G is a preset granularity. The granularity is related to a subcarrier spacing. First, $K_{offset1}$ and $K_{offset2}$ need to be adjusted to the same subcarrier spacing. For example, $K_{offset1}$=2 slots and the subcarrier spacing is 15 kHz, and $K_{offset2}$=3 slots and the subcarrier spacing is 30 kHz. The terminal needs to convert $K_{offset1}$ to the same subcarrier spacing of 30 kHz, that is, $K_{offset1}$=2 slot is converted to 4 slots when the subcarrier spacing is 30 kHz. Then, $K_{offset1}$ is compared with $K_{offset2}$, to obtain $(K_{offset2}/K_{offset1})=3/4$. Therefore, after the terminal is handed over to the BWP2, the RTT becomes shorter, and the TA2 also needs to be shortened correspondingly. A processing method that can be used here is as follows: First, $TA_1$ is scaled down, for example, $TA_1 \times 3/4$. Then, a minimum integer value N is selected, such that $TA_2=N \times G_{bwp2} \geq TA_1 \times 3/4$. $G_{bwp2}$ may represent a granularity in a subcarrier spacing of the BWP2.

(II) Inter-Beam Switching

In a communication process, the terminal sometimes needs to switch from one beam to another beam. Such a scenario may be caused because the terminal moves from one footprint to another, or the terminal may switch between a plurality of beams under the same footprint. Moreover, even if there is no footprint division, the terminal may also switch between different beams. One condition for beam switching may be as follows: When there is a problem with a beam currently being used for communication, the terminal needs to find a new and reliable beam to make the communication continued. Such beam switching may be referred to as a beam failure recovery (BFR).

Configuration parameters for beam recovery may also be configured in an uplink BWP configuration (BWP-UplinkDedicated) IE. In a BFR configuration (BeamFailureRecoveryConfig) IE, the base station may add a configuration parameter (for example, a TA related parameter) representing the TA related information. A granularity of the TA may be related to a subcarrier spacing of a BWP in which the BFR configuration IE is located. The BFR configuration IE may also comprise RACH resource configuration, and the RACH resource is used for sending, by the terminal, a beam failure recovery request. The request may be implemented by the terminal through sending a message 1 in the RACH resource. Therefore, when the terminal sends the message 1, the terminal may adjust its own TA based on the TA related information indicated in the BFR configuration information IE, and sends the message 1.

The following is an example of configuring a TA related parameter in the BeamFailureRecoveryConfig IE in the BWP-UplinkDedicated IE.

```
BWP-UplinkDedicated ::=        SEQUENCE {
beamFailureRecoveryConfig       SetupRelease
                                { BeamFailureRecoveryConfig }
...
}
```

```
BeamFailureRecoveryConfig ::=   SEQUENCE {
rach-ConfigBFR                  RACH-ConfigGeneric
TA related parameter
...
}
```

In the embodiments of the present application, under the environment of an ultra-long point-to-point distance and an ultra-high speed for the NTN, a more accurate TA may be obtained through one or more messages in various stages above. It is beneficial for the base station to correctly receive uplink transmission, thereby reducing interference of uplink transmission of the terminal to uplink transmission of other terminals. In some TDD cases, the impact on downlink transmission may also be reduced.

Figure 11:
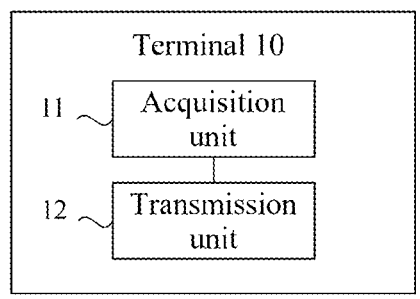
FIG. 11 is a schematic block diagram of a terminal according to one embodiment of the present application.

FIG. 11 is a schematic block diagram of a terminal 10 according to one embodiment of the present application. The terminal 10 may be a device in an NTN system. The terminal 10 may comprise:

an acquisition unit 11 configured to acquire timing advance (TA) related information, wherein the TA related information is used to indicate a TA used by the terminal for transmission; and a transmission unit 12 configured for transmission based on the TA.

Alternatively, in an embodiment of the present application, the acquisition unit is configured to receive first information from a network device, wherein the first information comprises the TA related information.

Alternatively, in an embodiment of the present application, with regard to carrying manners of the first information, references can be made to related descriptions of the embodiments of the transmission methods described above.

Alternatively, in an embodiment of the present application, the TA related information comprises a target value of a TA parameter, and the target value of the TA parameter is used to indicate the TA used by the terminal for transmission. With regard to types, meanings, and examples of the TA parameter, and manners of obtaining the target value of the TA parameter based on the TA related information, references can be made to related descriptions of the embodiments of the transmission methods described above.

Alternatively, in an embodiment of the present application, the TA related information comprises a target value of a TA adjustment parameter. With regard to types, meanings, and examples of the TA adjustment parameter, and manners of obtaining the target value of the TA adjustment parameter based on the TA related information, references can be made to related descriptions of the embodiments of the transmission methods described above.

Figure 12:
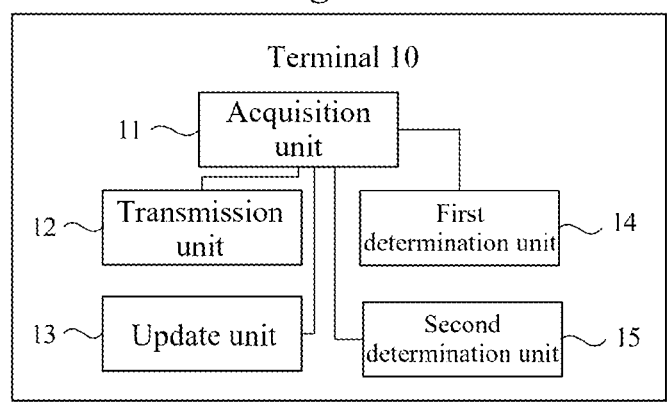
FIG. 12 is a schematic block diagram of a terminal according to another embodiment of the present application.

Alternatively, in an embodiment of the present application, as shown in FIG. 12, the terminal further comprises: an update unit 13 configured to update the TA based on a TA adjustment value.

Alternatively, in an embodiment of the present application, the update unit 13 is configured to obtain a second TA based on a first TA and the TA adjustment value.

Alternatively, in an embodiment of the present application, the terminal further comprises: a first determination unit 14 configured to determine a TA corresponding to a target BWP based on TA related information corresponding to the target BWP to which the terminal is to be handed over.

Alternatively, in an embodiment of the present application, the terminal further comprises: a second determination unit 15 configured to determine the TA corresponding to the target BWP by using a TA corresponding to a current activated BWP, a delay parameter corresponding to the current activated BWP, and a delay parameter corresponding to the target BWP to which the terminal is to be handed over.

Alternatively, in an embodiment of the present application, with regard to the delay parameter and a specific process of BWP handover, references can be made to related descriptions of the embodiments of the transmission methods described above.

Alternatively, in an embodiment of the present application, the acquisition unit is configured to acquire second information which comprises the TA related information.

Alternatively, in an embodiment of the present application, the acquisition unit is configured to obtain the second information by itself. The acquisition unit of the terminal obtains the second information by itself to carry out a process of determining the TA used by the terminal for transmission. References can be made to related descriptions of the embodiments of the transmission methods described above.

Alternatively, in an embodiment of the present application, with regard to the transmission unit configured for transmission in an uplink frame based on the TA, references can be made to related descriptions of performing transmission in the uplink frame based on the TA in the embodiments of the transmission methods described above.

Alternatively, in an embodiment of the present application, the transmission unit is further configured to send third information which comprises the TA related information. With regard to explanations, examples, and carrying manners of the third information, references can be made to related descriptions of the embodiments of the transmission methods described above.

Figure 13:
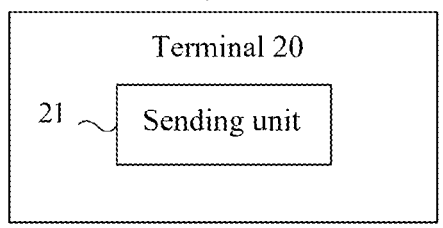
FIG. 13 is a schematic block diagram of a terminal according to another embodiment of the present application.

FIG. 13 is a schematic block diagram of a terminal 20 according to another embodiment of the present application. The terminal 20 may be a device in an NTN system. The terminal 20 may comprise: a sending unit 21 configured to send third information which comprises the TA related information. The TA related information is used to indicate a TA used for transmitting the third information.

Alternatively, in an embodiment of the present application, the third information is transmitted in an uplink frame.

Alternatively, in an embodiment of the present application, a start point of the uplink frame is earlier than that of a downlink frame corresponding to the uplink frame, and the length of the advanced time is the TA or a calculation result of the TA and an offset.

Alternatively, in an embodiment of the present application, the uplink frame and the downlink frame are at the terminal side.

Alternatively, in an embodiment of the present application, the third information is transmitted in at least one of a PRACH, a PUSCH, an SRS, and a PUCCH.

Alternatively, in an embodiment of the present application, when the third information is transmitted in the PRACH, the third information is represented by a random access preamble index and/or a resource location of a PRACH occasion.

Alternatively, in an embodiment of the present application, the third information is carried in a message 3 in a random access process.

Alternatively, in an embodiment of the present application, the TA related information in the third information comprises a target value of a TA parameter or a range of the target value.

Alternatively, in an embodiment of the present application, with regard to types, meanings, and examples of the TA parameter, and manners of obtaining the target value of the TA parameter based on the TA related information, references can be made to related descriptions of the embodiments of the transmission methods described above.

The terminal in the embodiments of the present application can implement corresponding functions of the terminal in the above-mentioned method embodiments. With regard to processes, functions, implementations, and beneficial effects corresponding to the various modules (submodules, units, components, etc.) in the terminal, references can be made to corresponding descriptions in the method embodiments described above, which will not be repeatedly described herein.

It should be noted that, functions described for the various modules (submodules, units, components, etc.) in the terminal in the embodiments of the present application may be implemented by different modules (submodules, units, components, etc.) or the same module (submodule, unit, component, etc.).

Figure 14:
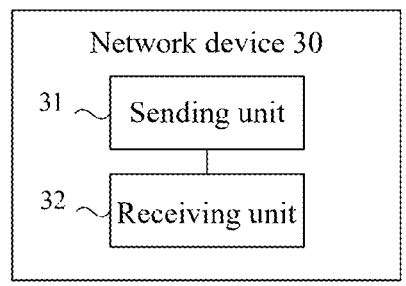
FIG. 14 is a schematic block diagram of a network device according to one embodiment of the present application.

FIG. 14 is a schematic block diagram of a network device 30 according to one embodiment of the present application. The network device 30 may be a device in an NTN system. The network device 30 may comprise:

a sending unit 31 configured to send timing advance (TA) related information, wherein the TA related information is used to indicate a TA used by the terminal for transmission; and a receiving unit 32 configured to receive transmission performed by the terminal based on the TA.

Alternatively, in an embodiment of the present application, the sending unit 31 is configured to send first information which comprises the TA related information.

Alternatively, in an embodiment of the present application, with regard to carrying manners of the first information, references can be made to related descriptions of the embodiments of the transmission methods described above.

Alternatively, in an embodiment of the present application, the TA related information comprises a target value of a TA parameter, and the target value of the TA parameter is used to indicate the TA used by the terminal for transmission. With regard to types, meanings, and examples of the TA parameter, and manners of obtaining the target value of the TA parameter based on the TA related information, references can be made to related descriptions of the embodiments of the transmission methods described above.

Alternatively, in an embodiment of the present application, the TA related information comprises a target value of a TA adjustment parameter. With regard to types, meanings, and examples of the TA adjustment parameter, and manners of obtaining the target value of the TA adjustment parameter based on the TA related information, references can be made to related descriptions of the embodiments of the transmission methods described above.

Alternatively, in an embodiment of the present application, with regard to the receiving unit configured to receive transmission performed by the terminal in an uplink frame based on the TA, references can be made to related descriptions of performing transmission in the uplink frame based on the TA in the embodiments of the transmission methods described above.

Alternatively, in an embodiment of the present application, said receiving, by the receiving unit 32, transmission performed by the terminal based on the TA comprises at least one of PRACH, PUSCH, SRS, and PUCCH transmissions.

Alternatively, in an embodiment of the present application, the receiving unit 32 receives third information sent by the terminal, wherein the third information comprises the TA related information.

Alternatively, in an embodiment of the present application, when the third information is transmitted in a PRACH, the third information is represented by a random access preamble index and/or a resource location of a PRACH occasion.

Alternatively, in an embodiment of the present application, the third information is carried in a message 3 in a random access process.

Alternatively, in an embodiment of the present application, the TA related information in the third information comprises a target value of a TA parameter or a range of the target value.

Figure 15:
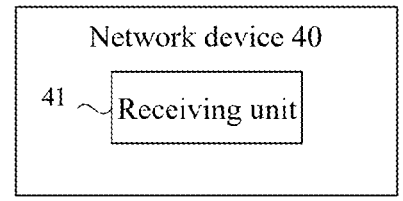
FIG. 15 is a schematic block diagram of a network device according to another embodiment of the present application.

FIG. 15 is a schematic block diagram of a network device 40 according to another embodiment of the present application. The network device 40 is a device in an NTN system. The network device 40 may comprise: a receiving unit 41 configured to receive third information which comprises TA related information. The TA related information is used to indicate a TA used for transmitting the third information.

Alternatively, in an embodiment of the present application, the third information is transmitted in an uplink frame.

Alternatively, in an embodiment of the present application, a start point of the uplink frame is earlier than that of a downlink frame corresponding to the uplink frame, and the length of the advanced time is the TA or a calculation result of the TA and an offset.

Alternatively, in an embodiment of the present application, the uplink frame and the downlink frame are at the terminal side.

Alternatively, in an embodiment of the present application, the third information is transmitted in at least one of a PRACH, a PUSCH, an SRS, and a PUCCH.

Alternatively, in an embodiment of the present application, when the third information is transmitted in the PRACH, the third information is represented by a random access preamble index and/or a resource location of a PRACH occasion.

Alternatively, in an embodiment of the present application, the third information is carried in a message 3 in a random access process.

Alternatively, in an embodiment of the present application, the TA related information in the third information comprises a target value of a TA parameter or a range of the target value.

Alternatively, in an embodiment of the present application, with regard to types, meanings, and examples of the TA parameter, and manners of obtaining the target value of the TA parameter based on the TA related information, references can be made to related descriptions of the embodiments of the transmission methods described above.

The network device in the embodiments of the present application can implement corresponding functions of the network device in the above-mentioned method embodiments. With regard to processes, functions, implementations, and beneficial effects corresponding to the various modules (submodules, units, components, etc.) in the network device, references can be made to corresponding descriptions in the method embodiments described above, which will not be repeatedly described herein.

It should be noted that, functions described for the various modules (submodules, units, components, etc.) in the network device in the embodiments of the present application may be implemented by different modules (submodules, units, components, etc.) or the same module (submodule, unit, component, etc.).

Figure 16:
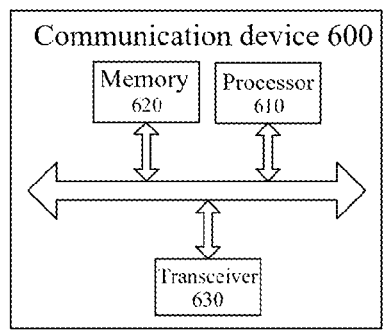
FIG. 16 is a schematic block diagram of a communication device according to an embodiment of the present application.

FIG. 16 is a schematic structural diagram of a communication device 600 according to an embodiment of the present application. The communication device 600 shown in FIG. 16 comprises a processor 610, and the processor 610 may invoke and run a computer program from a memory, so as to implement the methods in the embodiments of the present application.

Alternatively, as shown in FIG. 16, the communication device 600 may further comprise a memory 620. The processor 610 may invoke and run a computer program from the memory 620, so as to implement the method in the embodiments of the present application.

The memory 620 may be a separate device independent of the processor 610, or may be integrated into the processor 610.

Alternatively, as shown in FIG. 16, the communication device 600 may further comprise a transceiver 630, and the processor 610 may control the transceiver 630 to communicate with other devices, which, specifically, makes it possible to send information or data to other devices or receive information or data sent by other devices.

The transceiver 630 may comprise a transmitter and a receiver. The transceiver 630 may further comprise an antenna, and there may be one or more antennas.

Alternatively, the communication device 600 may be the network device in the embodiments of the present application, and can implement corresponding flows, which are implemented by the network device, in various methods of the embodiments of the present application, which will not be repeatedly described herein for brevity.

Alternatively, the communication device 600 may be the terminal in the embodiments of the present application, and can implement corresponding flows, which are implemented by the terminal, in various methods of the embodiments of the present application, which will not be repeatedly described herein for brevity.

Figure 17:
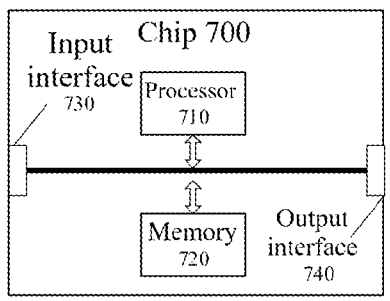
FIG. 17 is a schematic block diagram of a chip according to an embodiment of the present application.

FIG. 17 is a schematic structural diagram of a chip 700 according to an embodiment of the present application. The chip 700 shown in FIG. 17 comprises a processor 710, and the processor 710 may invoke and run a computer program from a memory, so as to implement the method in the embodiments of the present application.

Alternatively, as shown in FIG. 17, the chip 700 may further comprise a memory 720. The processor 710 may invoke and run a computer program from the memory 720, so as to implement the method in the embodiments of the present application.

The memory 720 may be a separate device independent of the processor 710, or may be integrated into the processor 710.

Alternatively, the chip 700 may further comprise an input interface 730. The processor 710 may control the input interface 730 to communicate with other devices or chips, which, specifically, makes it possible to acquire information or data sent by other devices or chips.

Alternatively, the chip 700 may further comprise an output interface 740. The processor 710 may control the output interface 740 to communicate with other devices or chips, which, specifically, makes it possible to output information or data to other devices or chips.

Alternatively, the chip may be applied to the network device in the embodiments of the present application, and can implement corresponding flows, which are implemented by the network device, in various methods of the embodiments of the present application, which will not be repeatedly described herein for brevity.

Alternatively, the chip may be applied to the terminal in the embodiments of the present application, and can implement corresponding flows, which are implemented by the terminal, in various methods of the embodiments of the present application, which will not be repeatedly described herein for brevity.

It should be appreciated that the chip mentioned in the embodiments of the present application may also be referred to as system-level chip, system chip, chip system, or system-on-chip, etc.

The processor mentioned above may be a general-purpose processor, a digital signal processor (DSP), a field programmable gate array (FPGA), an application specific integrated circuit (ASIC) or other programmable logic devices, transistor logic devices, or discrete hardware components, etc. The above-mentioned general-purpose processor may be a microprocessor or any conventional processor.

The memory mentioned above may be a volatile memory or a non-volatile memory, or may comprise both the volatile and non-volatile memories. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM).

It should be appreciated that the memory described above is exemplary but not restrictive illustration, for example, the memory in the embodiments of the present application may be further a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), a direct rambus random access memory (DR RAM), etc. That is, the memory in the embodiments of the present application is intended to include, but is not limited to, these and any other suitable types of memories.

Figure 18:
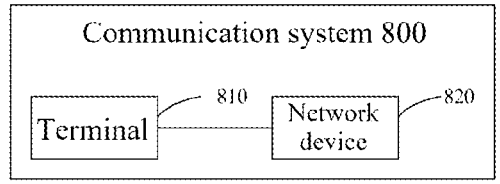
FIG. 18 is a schematic block diagram of a communication system according to an embodiment of the present application.

FIG. 18 is a schematic block diagram of a communication system 800 according to an embodiment of the present application. As shown in FIG. 18, the communication system 800 comprises a terminal 810 and a network device 820.

Alternatively, in an embodiment of the present application, the terminal 810 is configured to acquire TA related information, wherein the TA related information is used to indicate a TA used by the terminal for transmission; and perform transmission based on the TA. The network device is configured to send the TA related information; and receive TA-based transmission.

Alternatively, in an embodiment of the present application, the terminal is configured to send third information, and the network device is configured to receive the third information which comprises the TA related information. The TA related information is used to indicate a TA used for transmitting the third information.

The terminal 810 may be configured to implement the corresponding functions in the above-mentioned transmission methods that are implemented by the terminal, and the network device 820 may be configured to implement the corresponding functions in the above-mentioned methods that are implemented by the network device. For brevity, details are not repeatedly described herein.

The above embodiments may be implemented in whole or in part by software, hardware, firmware, or any combination thereof. When implemented by using the software, the embodiments may be implemented in whole or in part in the form of a computer program product. The computer program product includes one or more computer instructions. When the computer program instructions are loaded into and executed by a computer, the processes or functions described in accordance with the embodiments of the present application are conducted in whole or in part. The computer may be a general-purpose computer, a special-purpose computer, a computer network, or other programmable apparatuses. The computer instructions can be stored in a computer readable storage medium or transmitted from one computer readable storage medium to another computer readable storage medium. For example, the computer instructions can be transmitted from a website, computer, server or data center to another website site, computer, server, or data center in a wired manner (such as a coaxial cable, an optical fiber, or a digital subscriber line (DSL)) or a wireless manner (such as infrared, WiFi, or microwaves). The computer readable storage medium may be any available medium that can be accessed by a computer or a data storage device such as an integrated server or data center that includes one or more available media. The available medium may be a magnetic medium (such as a floppy disk, a hard disk, or a magnetic tape), an optical medium (such as a DVD), or a semiconductor medium (such as a solid state disk (SSD)), etc.

It should be appreciated that in the various embodiments of the present application, sequence numbers of the above processes do not mean an execution order, the execution order for the various processes should be determined by its function and internal logic, and should not constitute any limitation on the implementation process of the embodiments of the present application.

A person skilled in the art can clearly understand that, for the convenience and brevity of the description, references can be made to the corresponding process in the foregoing method embodiments for the specific working process of the system, apparatus and unit described above, which will not be repeatedly described herein.

The foregoing descriptions are merely specific embodiments of the present application, but the protection scope of the present application is not limited thereto, and any variation or replacement readily conceived by persons skilled in the art within the technical scope disclosed in the present application shall fall within the protection scope of the present application. Therefore, the protection scope of the present application should be defined by the protection scope of the claims.

The invention claimed is:

1. A transmission method, applied to a non-terrestrial network (NTN) system and comprising:
receiving, by a terminal, first information which comprises timing advance (TA) related information;
determining, by the terminal, a TA for transmission from the TA related information; and
performing, by the terminal, transmission based on the TA,
wherein the TA related information indicates a target value of a TA offset parameter;
the first information is carried in system information; and
the TA related information is comprised in a footprint configuration Information Element (IE) of the system information.

2. The method of claim 1, wherein the TA related information is further comprised in a serving cell configuration common System Information Block (SIB) Information Element (IE) of the system information.

3. The method of claim 1, wherein the TA related information further indicates a target value of a TA parameter.

4. The method of claim 3, wherein the TA parameter comprises the following:
a TA value;
a first numerical value; and
a first granularity.

5. The method of claim 4, wherein the TA value represents the length of the advanced time of the transmission performed by the terminal, the TA value depends on at least one of the first numerical value or the first granularity, and the first granularity represents a time unit of the first numerical value.

6. The method of claim 1, further comprising: sending, by the terminal, third information which comprises the TA related information.

7. A transmission method, applied to a non-terrestrial network (NTN) system and comprising:
sending, by a network device, first information which comprises timing advance (TA) related information, wherein a TA for transmission is determined by a terminal from the TA related information; and
receiving, by the network device, transmission performed by the terminal based on the TA,
wherein the TA related information indicates a target value of a TA offset parameter;
the first information is carried in system information; and
the TA related information is comprised in a footprint configuration Information Element (IE) of the system information.

8. The method of claim 7, wherein the TA related information is further comprised in a serving cell configuration common System Information Block (SIB) Information Element (IE) of the system information.

9. The method of claim 7, wherein the TA related information further indicates a target value of a TA parameter.

10. The method of claim 9, wherein the TA parameter comprises at least one of the following:
a TA value;
a first numerical value; and
a first granularity.

11. The method of claim 7, further comprising: receiving, by the network device, third information which comprises the TA related information from the terminal.

12. A terminal, applied to a non-terrestrial network (NTN) system and comprising:
a processor; and
a memory, configured to store a computer program,
wherein the processor is configured to run the computer program stored in the memory to:
receive first information which comprises timing advance (TA) related information;
determine a TA for transmission from the TA related information; and
perform transmission based on the TA,
wherein the TA related information indicates a target value of a TA offset parameter;
the first information is carried in system information; and
the TA related information is comprised in a footprint configuration Information Element (IE) of the system information.

13. The terminal according to claim 12, wherein the TA related information is further comprised in a serving cell configuration common System Information Block (SIB) Information Element (IE) of the system information.

14. The terminal according to claim 12, wherein the TA related information further indicates a target value of a TA parameter.

15. The terminal according to claim 14, wherein the TA parameter comprises at least one of the following:
a TA value;
a first numerical value; and
a first granularity.

16. The terminal according to claim 12, wherein the processor is further configured to run the computer program stored in the memory to: send third information which comprises the TA related information.

17. A network device, applied to a non-terrestrial network (NTN) system and comprising:
a processor; and
a memory, configured to store a computer program,
wherein the processor is configured to run the computer program stored in the memory to:
send first information which comprises timing advance (TA) related information, wherein a TA for transmission is determined by a terminal from the TA related information; and
receive transmission performed by the terminal based on the TA,
wherein the TA related information indicates a target value of a TA offset parameter;
the first information is carried in system information; and
the TA related information is comprised in a footprint configuration Information Element (IE) of the system information.

18. The network device of claim 17, wherein the TA related information further indicates a target value of a TA parameter.

19. The network device of claim 17, wherein the processor is further configured to run the computer program stored in the memory to:
 receive third information which comprises the TA related information from the terminal.

* * * * *